(12) United States Patent
Ryder et al.

(10) Patent No.: US 11,485,106 B2
(45) Date of Patent: Nov. 1, 2022

(54) FIRE HOSE AND MATERTAL THEREFORE

(71) Applicant: LAST CALL FOUNDATION, INC., Braintree, MA (US)

(72) Inventors: Noah L. Ryder, Silver Spring, MD (US); Stephen J. Jordan, Rockville, MD (US); Rodney D. Bentley, Jr., Rockville, MD (US); William McKinlay Bell, Braintree, MA (US); Kathleen Crosby-Bell, Braintree, MA (US)

(73) Assignee: LAST CALL FOUNDATION, INC., Braintree, MA (US)

( * ) Notice: Subject to any disclaimer, the term of this patent is extended or adjusted under 35 U.S.C. 154(b) by 6 days.

(21) Appl. No.: 17/193,446

(22) Filed: Mar. 5, 2021

(65) Prior Publication Data

US 2021/0206134 A1  Jul. 8, 2021

Related U.S. Application Data

(63) Continuation of application No. PCT/US2019/052141, filed on Sep. 20, 2019.

(60) Provisional application No. 62/733,823, filed on Sep. 20, 2018.

(51) Int. Cl.
| | |
|---|---|
| *B32B 1/08* | (2006.01) |
| *A62C 31/00* | (2006.01) |
| *B32B 5/02* | (2006.01) |
| *B32B 5/26* | (2006.01) |
| *B32B 25/10* | (2006.01) |
| *B32B 25/16* | (2006.01) |
| *B32B 27/12* | (2006.01) |

(Continued)

(52) U.S. Cl.
CPC ............ *B32B 1/08* (2013.01); *A62C 31/00* (2013.01); *B32B 5/024* (2013.01); *B32B 5/26* (2013.01); *B32B 25/10* (2013.01); *B32B 25/16* (2013.01); *B32B 27/12* (2013.01); *B32B 27/36* (2013.01); *B32B 33/00* (2013.01); *B32B 2255/02* (2013.01); *B32B 2597/00* (2013.01)

(58) Field of Classification Search
CPC .. B32B 1/08; B32B 5/024; B32B 5/26; B32B 25/10; B32B 27/12; B32B 27/36; B32B 33/00; B32B 2255/02; B32B 2597/00; A62C 31/00
USPC .......................................... 138/137
See application file for complete search history.

(56) References Cited

U.S. PATENT DOCUMENTS 225,698 A * 3/1880 Gillespie ............... 138/137
706,466 A * 8/1902 Stowe ................... 138/137

(Continued)

FOREIGN PATENT DOCUMENTS

| CN | 206072576 U | 4/2017 | |
|---|---|---|---|
| KR | 20170062769 A | 6/2017 | |
| WO | WO-9911962 A1 * | 3/1999 | ............ F16L 11/086 |

OTHER PUBLICATIONS

Extended European Search Report issued in App. No. EP19862993. 3, dated May 12, 2022, 10 pages.

*Primary Examiner* — Craig M Schneider
*Assistant Examiner* — David R Deal
(74) *Attorney, Agent, or Firm* — Dilworth IP, LLC

(57) ABSTRACT

Described herein are fire hoses incorporating new combinations of materials to increase the hose's resilience. Resilient hoses include those made with silicone-coated fabrics or with thermally-resistant fabrics or both.

17 Claims, 37 Drawing Sheets

(51) Int. Cl.
    *B32B 27/36*        (2006.01)
    *B32B 33/00*        (2006.01)

(56) References Cited

U.S. PATENT DOCUMENTS

| | | | | |
|---|---|---|---|---|
| 1,175,373 | A * | 3/1916 | Noack | F16L 33/01 |
| | | | | 138/109 |
| 1,220,661 | A * | 3/1917 | Many | F16L 11/10 |
| | | | | 138/119 |
| 1,256,520 | A * | 2/1918 | Coughlin | 138/137 |
| 2,097,862 | A * | 11/1937 | Mckay | F16L 11/086 |
| | | | | 138/137 |
| 2,329,836 | A * | 9/1943 | Huthsing | F16L 11/10 |
| | | | | 138/119 |
| 2,598,022 | A * | 5/1952 | Smith | F16L 11/10 |
| | | | | 138/119 |
| 2,674,297 | A | 4/1954 | Greenwald | |
| 3,911,962 | A | 10/1975 | Chomat | |
| 3,927,695 | A | 12/1975 | Crockwell | |
| 4,259,989 | A * | 4/1981 | Lalikos | F16L 25/01 |
| | | | | 428/113 |
| 4,675,221 | A * | 6/1987 | Lalikos | B25B 27/10 |
| | | | | 428/113 |
| 4,779,673 | A | 10/1988 | Chiles | |
| 5,927,342 | A * | 7/1999 | Bogut | F16L 11/127 |
| | | | | 138/104 |
| 9,040,133 | B2 | 5/2015 | Schubert | |
| 2008/0236696 | A1* | 10/2008 | Fukaya | B32B 5/026 |
| | | | | 138/137 |
| 2015/0059907 | A1* | 3/2015 | Richardson | F16L 57/06 |
| | | | | 138/124 |
| 2015/0136361 | A1 | 5/2015 | Gregory | |

* cited by examiner

FIRE HOSE AND MATERIAL THEREFORE

FIELD OF THE DISCLOSURE

This disclosure relates to fire hoses and the materials used to make them.

BACKGROUND

Firefighters and their equipment are exposed to extreme conditions in the operating environment. These conditions have changed over time due to changes in construction methods and materials. These changes have resulted in increased thermal exposures within a reduced operational timeline, as shown in FIG. 1. As response times have not significantly changed, the available safe operational time for firefighters has been reduced and their equipment is potentially subject to greater thermal exposure. (Ahrens M (2010) Home structure fires. National Fire Protection Association, Quincy; Fahy R F (2010) US fire service fatalities in structure fires, 1977-2009. National Fire Protection Research Foundation, Quincy)

Fire hoses in particular play a critical role in the response and in keeping firefighters safe. In the event that they are damaged or fail firefighter safety is severely threatened. The ability of firehose to withstand thermal exposure from fires has been a subject of study since the March 2014 fire incident in Boston, Mass. that resulted in the death of firefighters Michael R. Kennedy and Edward J. Walsh. A NIOSH study stated:

"Current hoseline standards do not address the thermal performance of attack hoselines, and technical information published by manufacturers does not include thermal performance data . . . Fire service research organizations, standards making organizations, equipment manufacturers, and fire departments should consider the effects of thermal degradation on fire attack hose."

(NIOSH, Death in the Line of Duty Report #F2014-09 (2016). Lieutenant and Fire Fighter Die and 13 Fire Fighters injured in a Wind-driven Fire in a Brownstone—Massachusetts). Recent research by Worcester Polytechnic Institute (WPI) identified 172 burn-through incidents of fire hose as of October 2015. The Bureau of Alcohol, Tobacco, Firearms and Explosives (ATF) has reported at least one additional incident occurred in February of 2018 during a fire in Missouri. (Thermal Impact of Radiant Heat on Interior Fire Attack Hose, Bureau of Alcohol Tobacco and Firearms Presentation, August 2014).

ATF conducted an experimental study using full-scale and bench-scale experiments to study the response of hoselines to thermal insults. The full-scale tests in the ATF study appeared to emphasize the performance of the hoseline itself, with little attention given to hoseline-coupling interaction, other than what might have been included in the full-scale tests. The full-scale experiments involved routing hoselines through two-story structures and measuring the approximate heat flux and temperature at the time of rupture. Hoselines that were dry and unpressurized, pressurized with water, and pressurized with water flowing through the nozzle were tested. Results indicate that when radiation levels at the floor reached between 14 and 35 $kW/m^2$, the hoselines ruptured. All of the hoselines had failed when the radiant exposure exceeded 40 $kW/m^2$ (Thermal Impact of Radiant Heat on Interior Fire Attack Hose, Bureau of Alcohol Tobacco and Firearms Presentation, August 2014). These exposures were used as the benchmark exposures for the subsequent small-scale tests in which air-charged and water-charged hoselines were tested in the cone calorimeter.

The following table provides a summary of exposure conditions and their consequences, incorporating the test conditions from the ATF study.

TABLE 1

Effect of Radiant Heat Flux Exposure (from NFPA 921) with ATF Hoseline Thermal Exposure Analysis Values Incorporated. (Thermal Impact of Radiant Heat on Interior Fire Attack Hose, Bureau of Alcohol Tobacco and Firearms Presentation, August 2014; Guide for Fire and Explosion Investigations (2014) NFPA 921, National Fire Protection Association, Quincy)

| Approximate Radiant Heat Flux ($kW/m^2$) | Comment or Observed Effect |
| --- | --- |
| 1.0 | Nominal solar constant on a clear summer day. |
| 5.0 | Human skin experiences pain with a 13-second exposure and blisters in 29 seconds with second-degree burn injury. |
| 10.0 | [Exposed] Human skin experiences pain with a 5-second exposure and blisters in 10 seconds with second-degree burn injury. |
| 20.0 | Heat flux on a residential family room floor at the beginning of flashover. |
| 29.0 | Wood ignites spontaneously after prolonged exposure. |
| 30.0 | "Low" Heat Flux Value used for ATF thermal analysis of hoselines (based on full scale scoping test data). |
| 40.0 | "High" Heat Flux Value used for ATF thermal analysis of hoselines (based on full scale scoping test data). |
| 52.0 | Fiberboard ignites spontaneously after 5 seconds. |
| ~80.0 | Heat flux for protective clothing Thermal Protective Performance (TPP) test. |
| 170.0 | Maximum heat flux as currently measured in a post flashover fire compartment. |

The testing of commercial fire hoses demonstrated the need for fire hose construction that can withstand conditions realistic to a real-world fire scenario. These tests also demonstrated that fire hoses of different compositions fail in different manners. Fire hoses tested were observed to fail in range of different severities from large orifice ruptures to small jetting and pinhole leakage. A weeping type failure was also observed for several tests conducted in which water saturated the exposed section of hose from the inside out while still maintaining the flow path of water. Weeping is believed to occur when the inner liner of the hose begins to fail prior to the outer jacket of the hose jacket, releasing water in a form other than jets or streams.

These studies highlight the need for firehoses with higher thermal resistance that will be more resistant to failure, improving firefighting efficiency, increasing firefighter safety and saving lives.

SUMMARY OF THE DISCLOSURE

Aspects of the invention relate to a fire hose having silicone-coated fabric. In some instances, the fabric is a woven fabric.

In some aspects, the silicone includes a filler. In some aspects, the filler is at least partially silica, montmorillonite, carbon black, carbon fiber, iron oxide, zinc oxide, titanium dioxide, glass, graphene, alumina, alumina tri-hydrate, or combinations thereof. In some aspects, the filler is at least partially silica. In some aspects, the filler is at least partially montmorillonite. In some aspects, the filler is at least partially carbon black. In some aspects, the filler is at least partially carbon fiber. In some aspects, the filler is at least partially iron oxide. In some aspects, the filler is at least partially titanium dioxide. In some aspects, the filler is at least partially glass. In some aspects, the filler is at least partially graphene. In some aspects, the filler is at least partially alumina. In some aspects, the filler is at least partially alumina tri-hydrate.

Aspects of the invention relate to a fire hose having a liner and a jacket with the liner inside the jacket, where the liner is a silicone-coated fabric. In some aspects, the fire hose has a second jacket outside the first jacket.

In some aspects, the silicone coats one side of the fabric. In some aspects, the silicone coats both sides of the fabric. In some aspects, the silicone-coated fabric has silicone impregnated within the fabric.

In some aspects where the silicone coats one side of the fabric, the silicone coating faces the inside of the hose. In some aspects where the silicone coats one side of the fabric, the silicone coating faces the outside of the hose.

In some aspects the hose further includes a lining inside the silicone-coated fabric. In such aspects, the lining may include styrene butadiene, ethylene propylene, EPDM, chloroprene, polyurethane, PVC/nitrile rubber, PVC/nitrile butadiene, nitrile butadiene, or combinations thereof.

In some aspects, the fabric that is silicone coated is at least partially made of cotton, polyester, nylon, silica, alumina, basalt, textured glass, fiberglass, p-aramid, m-aramid, polybenzimidazole, oxidized polyacrylonitrile or combinations thereof. In some aspects, the fabric is at least partially made of silica. In some aspects, the fabric is at least partially made of basalt. In some aspects, the fabric is at least partially made of fiberglass. In some aspects, the fabric is at least partially made of p-aramid. In some aspects, the fabric is at least partially made of m-aramid. In some aspects, the fabric is at least partially made of a combination of silica and fiberglass. In some aspects, the fabric is at least partially made of a combination of silica and alumina. In some aspects, the fabric is at least partially made of a combination of p-aramid and m-aramid. In some aspects, the fabric is at least partially made of a combination of polybenzimidazole and p-aramid. In some aspects, the fabric is at least partially made of a combination of polyacrylonitrile and p-aramid. In some aspects, the fabric is at least partially made of a combination of basalt and a polyamide.

In some aspects, the fabric that is silicone coated is a thermally resistant fabric. In some aspects, the thermally resistant fabric is at least partially made of silica, basalt fiberglass, p-aramid, m-aramid, polybenzimidazole, oxidized polyacrylonitrile or combinations thereof.

Aspects of the invention relate to a fire hose having a thermally-resistant fabric that is at least partially made of silica, alumina, basalt, textured glass, fiberglass or combinations thereof. In such aspects, the fire hose may further include a lining, where the lining is inside the thermally-resistant fabric, and where the is at least partially made of silicone, styrene butadiene, ethylene propylene, EPDM, chloroprene, polyurethane, or nitrile butadiene. In such aspects, the lining further comprises a filler. In some aspects, the filler is at least partially silica, montmorillonite, carbon black, carbon fiber, iron oxide, zinc oxide, titanium dioxide, glass, graphene, alumina, alumina tri-hydrate, or combinations thereof.

In some aspects, the fire hose may further include a jacket. In some such aspects, the jacket may be a fabric at least partially made of cotton, polyester, nylon or the jacket may be a thermally resistant fabric. In some such aspects the thermally resistant fabric jacket is at least partially made of silica, alumina, basalt textured glass, fiberglass, p-aramid, m-aramid, polybenzimidazole, oxidized polyacrylonitrile or combinations thereof.

DETAILED DESCRIPTION

Figure 1:
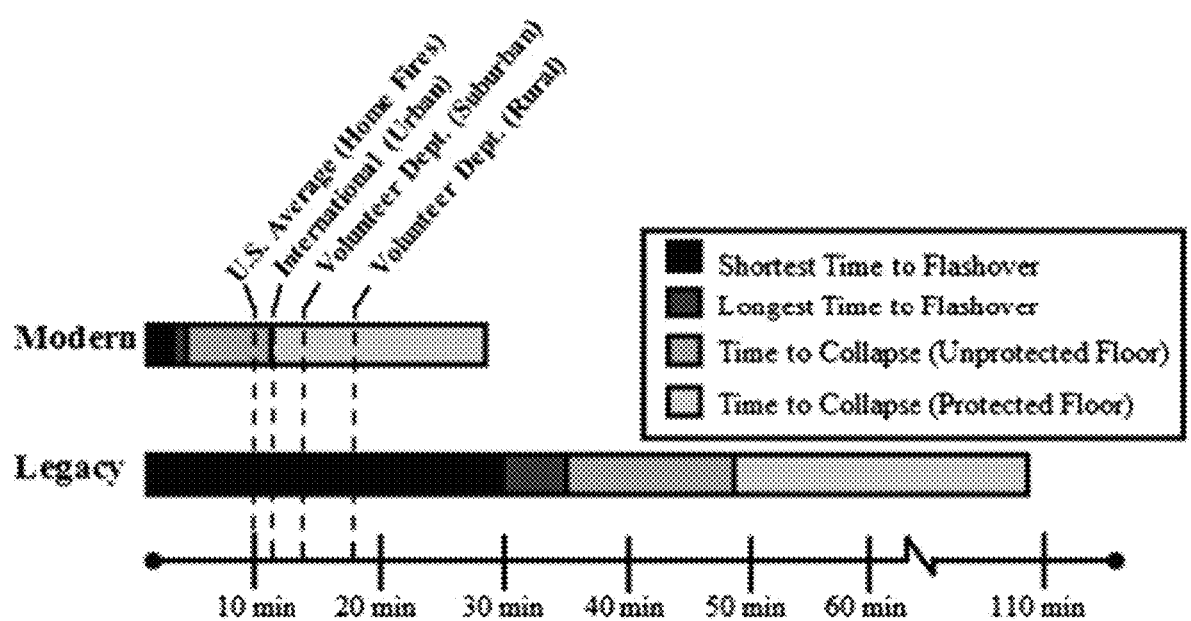
FIG. 1 shows a comparison of modern vs legacy safe operational timelines and department arrival times (Ahrens M., Home structure fires. National Fire Protection Association, Quincy (2010)).

Described herein are firefighter hoselines incorporating new combinations of materials to increase the hose's resilience.

Types of Hoses

Aspects of the invention include any hose that would benefit from fire and/or thermal resistance. The hoses described herein may be used in any application involving transport of water or other fluids but are particularly suited for transporting water in conditions where the hose may be exposed to flames, fire, or high temperatures. In some aspects of the invention, the hose is a fire hose of the type used by firefighters to fight fires.

Aspects of the invention include any type of fire hose. Fire hoses may be classified as different types, depending on their primary function. For example, the attack hose is a fabric-covered, flexible hose used to bring water from the fire pumper to the nozzle. This hose ranges in nominal inside diameter from 1.25 to 3 in (38 to 76 mm) and is designed to operate at pressures up to about 400 psi (2,760 kPa). The standard length is 50 ft (15.24 m). Supply and relay hoses are large-diameter, fabric-covered, flexible hoses used to bring water from a distant hydrant to the fire pumper or to relay water from one pumper to another over a long distance. These hoses range in nominal inside diameter from 3.5 to 5.0 in (89 to 127 mm). They are designed to operate at pressures up to about 300 psi (2,070 kPa) for the smaller diameters and up to 200 psi (1,380 kPa) for the larger diameters. The standard length is 100 ft (30.48 m). Forestry hoses are fabric-covered, flexible hoses used to fight fires in grass, brush, and trees where a lightweight hose is needed in order to maneuver it over steep or rough terrain. Forestry hose comes in 1.0 and 1.5 in (25 and 38 mm) nominal inside diameters and is designed to operate at pressures up to about 450 psi (3,100 kPa). The standard length is 100 ft (30.48 m). Booster hoses are rubber-covered, thick-walled, flexible hose used to fight small fires. A booster hose frequently retains its round cross-section when it is not under pressure and is usually carried on a reel on the fire pumper, rather than being stored flat. Booster hose comes in 0.75 and 1.0 in (19 and 25 mm) nominal inside diameters and is designed to operate at pressures up to 800 psi (5,520 kPa). The standard length is 100 ft (30.48 m). Suction hoses are sometimes called hard suction and usually are rubber-covered, semi-rigid hose with internal metal reinforcements. It is used to suck water out of unpressurized sources, such as ponds or rivers, by means of a vacuum. Suction hose ranges in nominal inside diameter from 2.5 to 6.0 in (64 to 152 mm). The standard length is 10 ft (3.05 m).

In general, fire hoses and their fittings are governed by standards created by the National Fire Protection Association. For example, NFPA 1961 sets specifications for fire hoses. NFPA 1962 sets standards for the care, use, inspection and service testing of fire hose. NFPA 1963 sets requirements for Fire Hose Connections. NFPA 1964 sets requirements for fire hose nozzles. NFPA 1901 sets standards for Automotive Fire Apparatus.

Hose Materials

Aspects of the invention include hoses having a silicone-coated fabric. Any sort of fabric suitable for fire hoses may be used, including woven fabrics, non-woven fabrics, knit fabrics, spun lace fabrics, 3D printed fabrics, etc. Commonly, fire hose fabrics used woven fabrics, produced by weaving at least two yarns or threads, usually at right angles to each other.

As used herein, silicone-coated fabric means that the fabric has been treated with silicone on one or both sides such that one or more fabric surfaces is substantially covered in silicone, or that the fabric has been treated with silicone such that the silicone impregnates the fabric between the fibers or yarns of the fabric, or both. In some aspects, the fabric may be pre-treated or pre-coated before coating with silicone. In other aspects, the fabric directly contacts the silicone. Without wishing to be bound by theory, the silicone coating increases the thermal resistance of the fabric, and therefore increases the thermal resistance of the hose. The increased thermal resistance improves the ability of the hose to function without damage that causes the hose to rupture, break, or leak when exposed to flame, fire, or high temperatures.

Silicone is a class of polymers that include any inert, synthetic compound made up of repeating units of siloxane, which is a chain of alternating silicon atoms and oxygen atoms, combined with carbon, hydrogen, and sometimes other elements. In some aspects, the silicone coating is silicone rubber, which is a silicone elastomer.

The silicone may include fillers to alter its properties so long as it remains water resistant, flexible, heat resistant, and relatively light weight. Examples of fillers include pigments, reinforcing fillers, semi-reinforcing fillers, and fillers such as silica (precipitated and fumed), montmorillonite, carbon black, carbon fiber, iron oxide, zinc oxide, titanium dioxide, glass, graphene, graphene nanoplatelets (GNPs), alumina, alumina tri-hydrate, and combinations of the above fillers. In some aspects, the silicone contains iron oxide filler. In some aspects, the silicone contains alumina fillers. In some aspects, the silicone contains montmorillonite fillers. In some aspects, the silicone contains silica fillers. The fillers may be produced according to any method known in the art. For example, carbon fibers may be made from polyacrylonitrile (PAN) or from mesophase pitch. The filler may be blended with the silicone using methods known in the art, such as, melt compounding, kneader dispersion, or other methods known in the art.

The fabric in the silicone-coated fabric may be any fabric with sufficient flexibility and integrity for use in a fire hose, including traditional woven fabric materials, like cotton, polyester, or nylon fabrics, as well as thermally resistant fabrics described herein.

In aspects where the silicone-coated fabric is a woven fabric, the woven fabric can be woven in any pattern suitable to create a fabric that can be coated and with sufficient structural integrity to form a fire hose. For example, the woven fabric can be a simple weave, such as a plain weave, twill weave, satin weave or basket weave. In other aspects, the woven fabric can be a more complex weave such as a dobby weave, jacquard weave, or cross weave. The weave can be more dense or less dense, so long as the function of the fabric remains intact. In some aspects, the fabric is woven at a lower density to allow the coating to impregnate the woven fabric. In some aspects, the woven fabric is woven with a circular weave, such as, for example, a weave produced with a circular loom. In some aspects, the woven fabric is a simple weave fabric, such as a plain weave, twill weave, satin weave or basket weave.

In some aspects, the silicone-coated fabric may be a silicone-coated thermally resistant fabric. A thermally-resistant fabric includes fibers, threads, or yarns of thermally resistant materials or blend of materials. A thermally-resistant fabric and thermally-resistant material is a fabric or material having higher temperature-resistance or fire-resistance than cotton, polyester, or nylon, which means that the fabric is less-affected, or breaks down more slowly than these traditional materials, when exposed to the same elevated temperature and heat flux conditions. Examples of thermally resistant materials suitable for the thermally resistant silicone-coated fabric include fibers, threads, or yarns made of silica, alumina, basalt, textured glass, fiberglass, p-aramid, m-aramid, polybenzimidazole, oxidized polyacrylonitrile and combinations thereof. Without wishing to be bound by theory, the combination of silicone coating and thermally resistant woven fabric provides improved thermal resistance because of the combination of thermally resistant silicone coating and thermally resistant woven fabric.

The thermally resistant fabric may include a single material or combination of materials so long as the fabric is more thermally resistant than traditional fabric made of materials like cotton, polyester, or nylon, and retains the flexibility necessary to function as a fire hose. In some aspects, the thermally resistant woven fabric includes fibers, threads, or yarns of silica. In some aspects, the thermally resistant woven fabric includes fibers, threads, or yarns of basalt. In some aspects, the thermally resistant woven fabric includes fibers, threads, or yarns of alumina. In some aspects, the thermally resistant woven fabric includes fibers, threads, or yarns of textured glass. In some aspects, the thermally resistant woven fabric includes fibers, threads, or yarns of fiberglass. In some aspects, the thermally resistant woven fabric includes fibers, threads, or yarns of p-aramid (also known as KEVLAR®). In some aspects, the thermally resistant woven fabric includes fibers, threads, or yarns of m-aramid (also known as NOMEX®). In some aspects, the thermally resistant woven fabric includes fibers, threads, or yarns of polybenzimidazole (PBI). In some aspects, the thermally resistant woven fabric includes fibers, threads, or yarns of oxidized polyacrylonitrile (OPAN).

The fibers, threads, or yarns of the thermally resistant woven fabric may be 100% silica, alumina, basalt, textured glass, fiberglass, p-aramid, m-aramid, polybenzimidazole, or oxidized polyacrylonitrile. In some aspects, the thermally resistant woven fabric may be less than 100% silica, alumina, textured glass, fiberglass, p-aramid, m-aramid, polybenzimidazole, or oxidized polyacrylonitrile. In some aspects, the thermally resistant woven fabric may be more than 95%, more than 90%, more than 85%, more than 80%, more than 75%, more than 70%, more than 65%, more than 60%, more than 55%, or more than 50% silica, alumina, basalt, textured glass, fiberglass, p-aramid, m-aramid, polybenzimidazole, or oxidized polyacrylonitrile. In those aspects, the remainder may be another fiber, or may be another thermally resistant fiber, or the remainder may be a combination of one or more other fibers or thermally resistant fibers. In some aspects, the thermally resistant fabric includes a blend of silica and fiberglass, where either the silica or fiberglass is present in any of the above percentages, with the other making up at least a portion of the remainder.

In some aspects, the thermally resistant fabric includes a blend of basalt and a polyamide, such as nylon, m-aramid, or p-aramid where either the Basalt or polyamide is present in any of the above percentages, with the other making up at least a portion of the remainder. In some aspects, the thermally resistant fabric includes a blend of silica and alumina, where either the silica or alumina is present in any of the above percentages, with the other making up at least a portion of the remainder. In some aspects, the thermally resistant fabric includes a blend of p-aramid and m-aramid, where either the p-aramid or m-aramid is present in any of the above percentages, with the other making up at least a portion of the remainder. In some aspects, the thermally resistant fabric includes a blend of polybenzimidazole (PBI) and p-aramid in any of the above proportions, where either the polybenzimidazole (PBI) or p-aramid is present in any of the above percentages, with the other making up at least a portion of the remainder. In some aspects, the thermally resistant fabric includes a blend of oxidized polyacrylonitrile and p-aramid, where either the polyacrylonitrile or p-aramid is present in any of the above percentages, with the other making up at least a portion of the remainder.

In some aspects, the fabric of the silicone-coated fabric can include fibers, fine wire, threads, or yarns of material with high thermal conductivity. As used herein, high thermal conductivity means that the material has a higher thermal conductivity than fabric materials commonly used in fire hoses, such as cotton (~0.026-0.065 W/mK), polyester (~0.17 W/mK), or nylon (~0.25 W/mK) fabrics. The high thermal conductivity fiber may have a thermal conductivity above, for example, 0.3 W/mK, 0.5 W/mK, 0.7 W/mK, 0.8 W/mK, 0.9 W/mK, 1.0 W/mK, 2.0 W/mK, 3.0 W/mK, 5.0 W/mK, 7.0 W/mK, 10.0 W/mK, 15.0 W/mK, 20 W/mK, 25 W/mK, or 30 W/mK. Examples of high thermal conductivity fiber include, for example, metal threads, such as for example, stainless steel, copper, aluminum, copper alloys, copper-nickel alloys, such as constantan, aluminum alloys, or nickel-aluminum alloys, such as alumel; carbon fiber; or other fibers with high thermal conductivity. The amount of high thermal conductivity fiber should be low enough not to interfere with the heat resistance or integrity of the fabric. In some aspects, the high thermal conductivity fiber is less than 10%, less than 9%, less than 8%, less than 7%, less than 6%, less than 5%, less than 4%, less than 3%, less than 2% or less than 1% of the total fiber content of the fabric. The high thermal conductivity fiber may be woven into the fabric, for example, to form rings around the circumference of the hose, to form strands down the length of the hose, to form regions that extend through the thickness of the fabric layer, or combinations of any of these. Without wishing to be bound by theory, it is believed that the high thermal conductivity fiber will increase heat transfer from hot spots that may form on the hose surface and dissipate that heat, for example, around the circumference of the hose, down the length of the hose, or toward the center of the hose, which is cooled by water flowing through the hose.

In some aspects, the silicone-coated fabric is coated with silicone on one side of the fabric. In some aspects, the silicone-coated fabric is coated with silicone on both sides of the fabric. In some aspects, the silicone-coated fabric includes silicone impregnated within the fabric. In aspects where the silicone-coated woven fabric is impregnated with silicone, the fabric may also be coated on one or both sides. In aspects where the silicone-coated fabric is coated with silicone on both sides of the fabric, the inner coating may function as a water-tight inner liner of the hose.

The silicone coating may be any thickness sufficient to remain water-tight, i.e., to prevent water from passing through the coating in the absence of holes or openings in the coating. In some aspects, the coating may be any thickness between 0.001 inches and 0.125 inches, so long as the coating remains water-tight. In general, thicknesses within this range are sufficiently flexible, thermally resistance, and light-weight for use in fire hoses. In some aspects, the narrow end of the thickness range may be 0.005 inches, 0.01 inches, 0.015 inches, 0.02 inches, 0.025 inches, 0.03 inches, or 0.035 inches. In some aspects the thicker end of the thickness range may be 0.04 inches, 0.045 inches, 0.05 inches, 0.055 inches, 0.06 inches, 0.07 inches, 0.08 inches, 0.09 inches, 0.1 inches, 0.11 inches or 0.125 inches.

Hose Structure

The hoses of the present invention may have any structure suitable for conveying water at the force and pressure needed for firefighting. For example, in some aspects, the hose may be constructed to meet the standards established by the National Fire Protection Agency and published in NFPA 1961, Standard on Fire Hose. The fire hose may be, for example, a single jacket hose, a double jacket hose, a rubber single jacket hose, or a hard rubber noncollapsing type of hose so long as at least one layer of the hose includes the silicone-coated fabric described herein.

In some aspects, the fire hose may be a single jacket hose comprising an inner lining and an outer jacket. In such case, the inner lining may include a silicone-coated fabric as described herein. Additional layers, such as an adhesive layer, such as a heat activated adhesive layer or other curable adhesive layer, may be present between the inner lining and outer jacket if needed to bond the two together. A single jacket hose can save cost and can also save weight, which can be important in applications such as fighting forestry fires where the hose is often carried on foot by firefighters.

In some aspects, the jacket may be made of any fabric commonly found in commercial fire hoses, such as, for example, cotton, polyester, or nylon.

In some aspects, the jacket may be a thermally-resistant fabric, described previously. A thermally-resistant fabric is a fabric having higher temperature-resistance or fire-resistance than cotton, polyester, or nylon, which means that the fabric breaks down more slowly than traditional materials when exposed to the same elevated temperature conditions. Although described in detail above, the thermally-resistant fabric may have fibers or yarns made of silica, alumina, textured glass, fiberglass, p-aramid, m-aramid, polybenzimidazole, oxidized polyacrylonitrile or combinations thereof. When the thermally-resistant woven fabric is used as a jacket layer in combination with a silicone-coated woven fabric, the thermally-resistant woven fabric may also be silicone coated.

In some aspects, the firehose may be a double jacket hose having a single inner lining and two outer jackets. In such embodiments, the inner lining includes the silicone-coated fabric discussed previously. The double jacket hose has a second jacket outside the first jacket to improve durability in comparison to the single jacket hose and a higher burst test rating. In a double jacket hose, the two jacket layers may be the same or different material. For example, both jacket layers may be a jacket material traditionally used in fire hoses, such as cotton, polyester, or nylon. Alternatively, one jacket layer may be a traditional jacket fabric, such as cotton, polyester, or nylon, while the other jacket layer is a thermally-resistant fabric. If so, the cotton, polyester, or nylon fabric may be inside the thermally-resistant fabric, or the cotton, polyester, or nylon fabric may be outside the thermally-resistant fabric. Further still, the two jacket layers may both be thermally-resistant fabric. In such case, the two jacket layers may be the same or different thermally resistant fabric.

The jacket may be any color. To achieve coloration, the outer jacket may be impregnated with a dye, such as those found in chlorosulphonated polyethene (CSM) coatings, also known as Hypalon® coatings.

In aspects where only one side of the silicone-coated fabric is silicone coated, the silicone coating may face the inside of the hose or the outside. In some aspects, the silicone coating faces the inside of the hose toward the water or fluid transported in the hose. In some aspects, the silicone coating faces the outside of the hose toward the jacket layer or layers.

In some aspects, the hose may further comprise a second lining inside the silicone-coated fabric layer. In such aspects, the second lining may be made of any material used as a liner material in fire hoses, such as, for example, styrene butadiene, ethylene propylene, EPDM, chloroprene, polyurethane, thermoplastic polyurethane (TPU), PVC/nitrile rubber, PVC/nitrile butadiene, nitrile butadiene, or combinations thereof. In some aspects, the second lining inside the silicone-coated fabric layer may be made of silicone as described herein, including silicone with fillers. The second lining of silicone may be used with any silicone-coated fabric described herein.

In some aspects, an additional layer or layers may appear between the lining, inner jacket, and outer jacket. For example, an adhesive layer may be used to bind the lining to the inner jacket, or to bind the inner jacket to the outer jacket. In other aspects, an adhesive may bind the lining to the inner jacket and another adhesive bind the inner jacket to the outer jacket. In some aspects, the adhesive may be incorporated into the construction of the inner lining, inner jacket, or outer jacket, such that when activated by heat and/or pressure, the layers of the hose bind together.

In some aspects, the fire hose includes a coating on the outside of the outer jacket. Protective coatings may protect the hose from things like abrasion, hot embers and pickup of extra water and other fluids like oils or hazardous materials. The coatings typically give the hose its color as well. Generally speaking, coatings may include the same materials used for traditional fire hose lining For example, the coating may include synthetic rubbers such as styrene butadiene, ethylene propylene, chloroprene, polyurethane, and nitrile butadiene.

Figure 2:
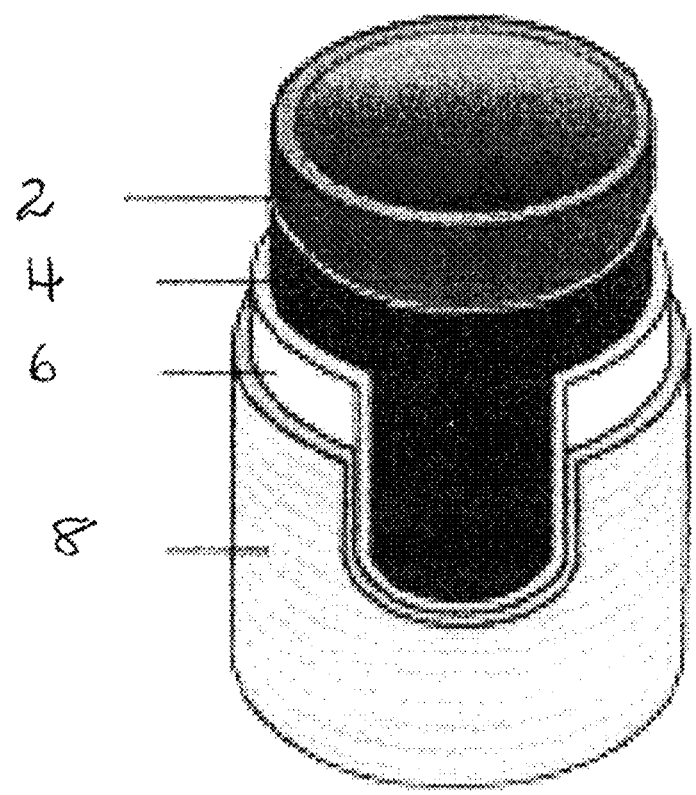
FIG. 2 shows a diagram of one embodiment of the invention.

FIG. 2 illustrates features of some aspects of the invention. As shown in FIG. 2, in some aspects of the invention, the fabric layer 2 is the innermost layer of the hose with silicone coating 4 to form a liner of the silicone-coated fabric described herein. As discussed previously, in such embodiments, an optional second liner (not shown) may be present inside the silicone-coated fabric liner. Optional first jacket 6 and optional second jacket 8 are also shown in FIG. 2.

Another illustrative example includes embodiments where the innermost layer is a hose waterproofing layer (not shown in FIG. 2). The next layer (2) is a structural layer having a circular weave or composite designed to withstand longitudinal and circumferential stress in the hose wall due to the design pressure. This structural layer may not necessarily be waterproof, but may be made waterproof with a fabric weave or composite fabric infused with silicone rubber (with an iron oxide filler, for example) on both sides, to protect the fibers and increase temperature resistance. The fiber weave could be, for example, basalt fiber, or another thermally-resistant fiber described herein. The outer layer (6) serves to protect the structural layer and is, typically, a nylon-polyester weave. In such an embodiment, these materials have a high emissivity in the range of 0.85 to 0.92, which means that 80% to 92% of radiant heat impinging on this "colder" outer layer is absorbed.

In some embodiments the hose may have an outer surface with an emissivity in the range of about 0.2 to about 0.8, which could reduce the absorbed heat to between about 50% to about 80%, provided there were cooler objects to reflect to. This could result in lowering the "hot spot" temperature. The emissivity could be accomplished by using a material that has an emissivity of about 0.2 to about 0.8 in the outermost jacket layer. Alternatively, the surface could be cleaned and restored/recoated to exhibit a 0.8 emissivity. Another possibility would be to cover the outer layer with a reflecting tape to lower the emissivity. The reflective tape could, for example, be cleaned/restored after use or replaced before each use.

Other Hoses

Aspects of the invention include fire hoses having a thermally-resistant fabric having threads, fibers, or yarns of silica, alumina, textured glass, fiberglass or combinations thereof. The thermally resistant fabric increases the thermal resistance of the hose, even in the absence of a silicone coating. As above, the fibers, threads, or yarns of the thermally resistant woven fabric may be 100% silica, alumina, textured glass, or fiberglass. In some aspects, the thermally resistant woven fabric may be less than 100% silica, alumina, textured glass, or fiberglass. In some aspects, the thermally resistant woven fabric may be more than 95%, more than 90%, more than 85%, more than 80%, more than 75%, more than 70%, more than 65%, more than 60%, more than 55%, or more than 50% silica, alumina, textured glass, or fiberglass. In those aspects where the thermally-resistant fabric is not 100% silica, alumina, textured glass, or fiberglass the remainder may be another fiber, or may be another thermally resistant fiber including silica, alumina, textured glass, fiberglass, p-aramid, m-aramid, polybenzimidazole, or oxidized polyacrylonitrile. In some aspects, the thermally resistant fabric includes a blend of silica and fiberglass, where either the silica or fiberglass is present in any of the above percentages, with the other making up at least a portion of the remainder. In some aspects, the thermally resistant fabric includes a blend of silica and alumina, where either the silica or alumina is present in any of the above percentages, with the other making up at least a portion of the remainder.

In aspects of the invention having a thermally-resistant fabric having threads, fibers, or yarns of silica, alumina, textured glass, fiberglass or combinations thereof, but lacking a silicone coating, the fire hose may further include a lining inside the thermally-resistant woven fabric. The lining is water-tight and allows the fire hose to transport water when the thermally-resistant woven fabric lacks a silicone coating. In those aspects, the lining may be made of any lining material suitable for use in fire hoses, such as, for example, styrene butadiene, ethylene propylene, EPDM, chloroprene, polyurethane, PVC/nitrile rubber, PVC/nitrile butadiene, nitrile butadiene, or combinations thereof.

In aspects of the invention having a thermally-resistant fabric having threads, fibers, or yarns of silica, alumina, textured glass, fiberglass or combinations thereof, but lacking a silicone coating, the fire hose may further include a jacket outside the thermally-resistant fabric. The jacket may be any material suitable for use as a jacket layer in a fire hose, such as, for example, cotton, polyester, or nylon. Alternatively, the jacket may also be a thermally-resistant fabric discussed above in the context of silicone-coated thermally-resistant fabrics. In some aspects, the jacket may be a silicone-coated fabric described previously, or a silicone-coated thermally resistant fabric described previously.

Manufacture

The hoses of the present invention may be manufactured using conventional manufacturing processes usually used to prepare jacket layers for fire hoses. The following manufacturing processes are examples of conventional manufacturing methods for woven fabric hoses.

Preparing the Yarn

The fibers described herein, including thermally-resistant fibers, may be formed into yarns using methods known in the art. In some cases, the fibers may need to be sized before blending to soften the fibers or reduce brittleness.

There are two different fiber yarns that are woven together to form the fabric. The yarns that run lengthwise down the hose are called warp yarns. They form the inner and outer surfaces of the hose fabric and provide abrasion resistance for the hose. The yarns that are wound in a tight spiral around the circumference of the hose are called the filler yarns. They are trapped between the crisscrossing warp yarns and provide strength to resist the internal water pressure.

Weaving the Jackets

The warp yarns are staged on a creel, which will feed them lengthwise down through a circular loom. Two filler bobbins with the filler yarn are put in place in the loom.

As the loom starts, the filler bobbins wind the filler yarn in a circle through the warp yarns. As soon as the bobbins pass, the loom crisscrosses each pair of adjacent warp yarns to trap the filler yarn between them. This weaving process continues at a high speed as the lower end of the fabric is slowly drawn down through the loom, and the bobbins continue to wrap the filler yarns around the circumference of the jacket in a tight spiral. The woven jacket is wound flat on a take-up reel.

If two jackets are used, the inner and outer jackets typically are woven separately. The inner jacket is woven to a slightly smaller diameter so that it will fit inside the outer jacket. Depending on the expected demand, several thousand feet may be woven at one time.

In some processes, if the outer jacket is to be coated, it is drawn through a dip tank filled with the coating material and then passed through an oven where the coating is dried and cured.

Silicone Coating

For silicone coated fabrics, the fabric is coated with silicone using standard techniques known in the art, and may be, for example, dipped, immersed, extruded, or spray coated. For example, silicone coating processes used by companies such as ADL Insulflex, Dow Textiles, and others may be used.

Extruding the Optional Liner

For conventional rubber liners, such as EPDM, blocks of softened, sticky, uncured rubber may be fed into an extruder. The extruder warms the rubber and presses it out through an opening between an inner and outer solid circular piece to form a tubular liner. The rubber liner may then be heated in an oven where it undergoes a chemical reaction called vulcanizing or curing. This makes the rubber strong and pliable. The cured liner passes through a rubber calendar machine, which forms a thin sheet of uncured rubber and wraps it around the outside of the liner.

When using a conventional rubber liner, the jackets and liner are cut to the desired length. The inner jacket is inserted into the outer jacket, followed by the liner. A steam connection is attached to each end of the assembled hose, and pressurized steam is injected into the hose. This makes the liner swell against the inner jacket and causes the thin sheet of uncured rubber to vulcanize and bond the liner to the inner jacket. The metal end connections, or couplings, are attached to the hose. The outer portion of each coupling is slipped over the outer jacket and an inner ring is inserted into the rubber liner. An expansion mandrel is placed inside the hose and expands the ring. This squeezes the jackets and liner between the ring and serrations on the outer portion of the coupling to form a seal all the way around the hose.

In some aspects where silicone is used as the inner liner, the silicone or silicone/filler blend may be extruded to form a tube around which a fabric (or thermally-resistant fabric) layer is woven, thereby forming the silicone-coated fabric. The silicone-coated fabric thus produced can then be further silicone-coated to prepare a silicone coated fabric with silicone (or silicone/filler blend) on both sides of the fabric.

Coating

If desired, coatings are applied to the hose after it is constructed, and in some cases, they are baked on. In some cases, the hose is run through rollers as it is coated to forcibly impregnate the coating into the hose. Colored yarn may also be used to create tracer stripes in some models of hose, so that different colored stripes can indicate the different hose diameters or be used to color code the hose in a system of the end user's preference.

Texturing

In some aspects where the silicone-coated fabric has silicone coating on the outside of the hose, the outer silicone surface may be textured. The texture on the surface can take any form or pattern, such as, for example, one or more rings around the circumference of the hose, one or more raised ridges extending the length of the hose, one or more raised spirals circling the circumference and extending the length of the hose, or one or more criss-cross patterns of two raised spirals circling in opposite directions. The texture may be, for example less than 10 mm high, less than 9 mm high, less than 8 mm high, less than 7 mm high, or less than 5 mm high. Without wishing to be bound by theory, the surface texture can reduce abrasion of the hose, especially moving over rough surfaces.

Pores

In some aspects the silicone-coated fabric may include micropores or pinholes. As used herein, micropore or pinholes are sufficiently small to allow a small amount of water to seep through the hose when the hose is pressurized, but not enough to substantially reduce the water flow rate through the hose. Without wishing to be bound by theory, allowing a small amount of water through the hose allows water from inside the hose to wet the outside of the hose, reducing the possibility of burnthrough from the outside.

Pressure Testing the Hose

Standards set by the National Fire Protection Association require that each length of new double jacket, rubber-lined attack hose must be pressure tested to 600 psi (4,140 kPa), but most manufacturers test to 800 psi (5,520 kPa). While the hose is under pressure, it is inspected for leaks and to determine that the couplings are firmly attached. After testing the hose is drained and dried.

The present invention may be embodied in other specific forms without departing from the spirit or essential attributes thereof. Thus, the above embodiments should not be considered limiting. Any and all embodiments of the present invention may be taken in conjunction with any other embodiment or embodiments to describe additional embodiments. Each individual element of the embodiments is its own independent embodiment. Furthermore, any element of an embodiment is meant to be combined with any and all other elements from any embodiment to describe an additional embodiment. In addition, the present invention encompasses combinations of different embodiments, parts of embodiments, definitions, descriptions and examples of the invention noted herein.

EXAMPLES

The testing of commercial fire hoses demonstrated the need for fire hose construction that can withstand conditions realistic to a real-world fire scenario. These tests also demonstrated that fire hoses of different compositions fail in different manners. Commercial fire hoses tested were observed to fail in range of different severities from large orifice ruptures to small jetting and pinhole leakage. A weeping type failure was also observed for several tests conducted in which water saturated the exposed section of hose from the inside out while still maintaining the flow path of water. Weeping is believed to occur when the inner liner of the hose begins to fail prior to the outer jacket of the hose jacket, releasing water in a form other than jets or streams.

Aspects of the invention include innovative materials for use in creating more resilient firefighter hoselines. These materials were discovered by evaluating commercially-available fabrics through bench-scale testing and then leveraging the results to determine resilient materials for fire hoses. The fabrics tested, because they are flat fabrics, are not suitable for making fire hoses, but have compositions similar to the thermally resistant fabrics described herein and demonstrate the thermal properties of the thermally resistant fabrics described herein. The bench-scale testing demonstrated the importance of the material selection in the development of a more durable fire hose. Several materials tested demonstrated noteworthy resilience to incident heat fluxes up to 50 kW/m$^2$ and did not ignite The bench-scale testing was followed by full-scale testing of one of the illustrative materials in a prototype hose construction. From the full-scale testing, material 'A' shows that both sides of that material can hold up to the designated heat flux without reaching any form of hose failure for exposures lasting 20 minutes at an incident heat flux of 30 kW/m$^2$. Compared to commercially available hose materials, the hose constructions tested demonstrate that hoses constructed from the materials with superior thermal resistance have superior resilience to incident heat fluxes, thereby providing an uncompromised waterway for longer than any other hose tested to date.

Small-Scale Testing

Small-scale experiments were conducted in the University of Maryland's fire laboratory to assess the thermal resistance of illustrative materials. The illustrative materials were commercially available fabrics selected to represent different fabric types as a proof-of-concept demonstrating the effectiveness of using thermally-resistant materials, like those tested, in fire hoses. As flat woven fabrics, the commercially available fabrics are not capable of being formed into fire hoses.

The illustrative material samples were exposed to three heat fluxes under the ASTM E 1354 cone calorimeter test apparatus. The samples analyzed were insulated to simulate the thermally thick nature of a charged hose line. The materials were exposed to the cone heating element and evaluated for off-gassing, discoloration, thermal degradation, ignition time, and burn through. Measurements of incident heat flux, mass loss rate, and oxygen consumptions can be used to calculate the heat release rate and effective heat of combustion in addition to ignition delay curves for the different materials evaluated.

Small-Scale Testing: Cone Calorimeter

Figure 3:
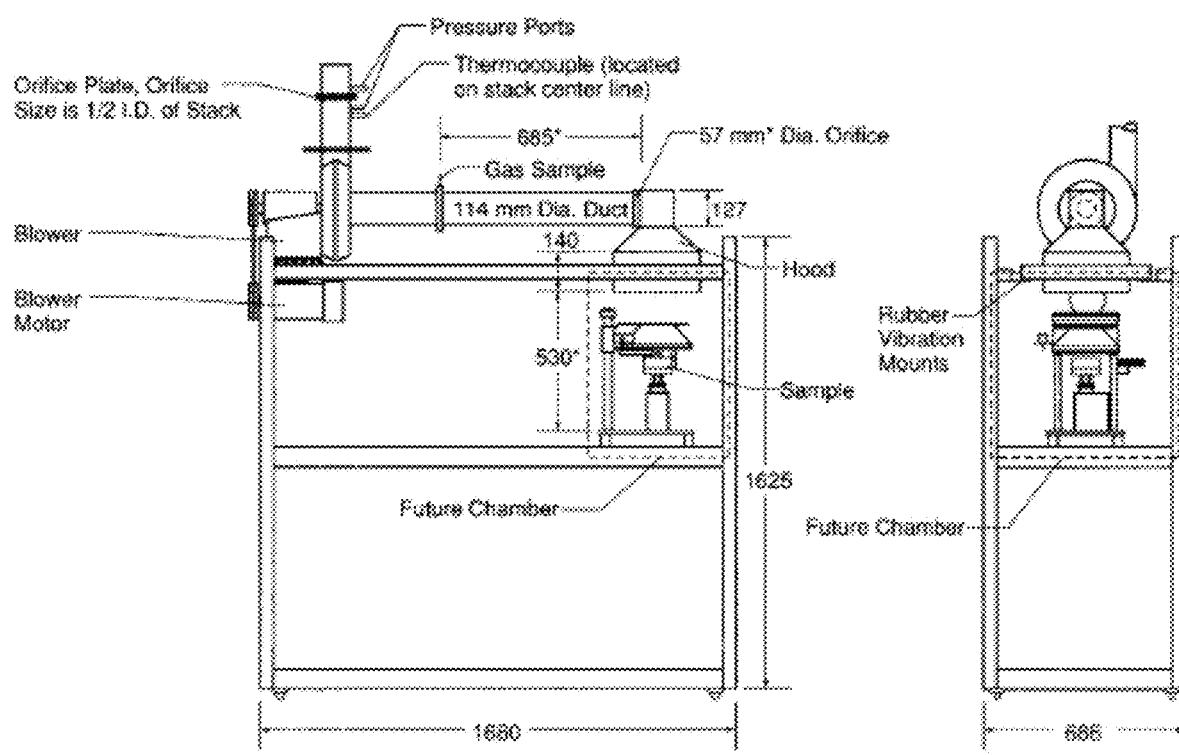
FIG. 3 shows an ASTM E1354 Standard cone calorimeter apparatus (dimensions shown are in millimeters).
Figure 4A:
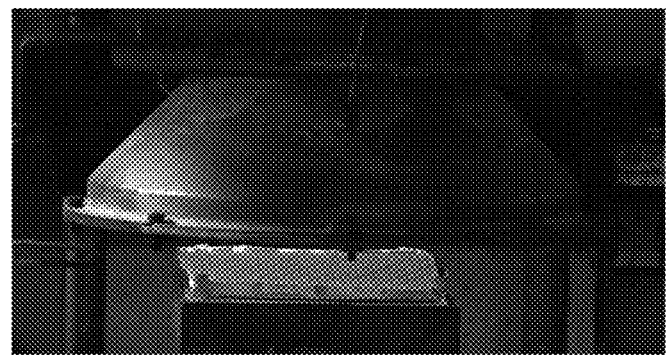
FIG. 4A-FIG. 4D show sample behaviors in the cone calorimeter; initial heating (FIG. 4A); off-gassing (FIG. 4B); ignition (FIG. 4C); and extensive thermal degradation (FIG. 4D).
Figure 4B:
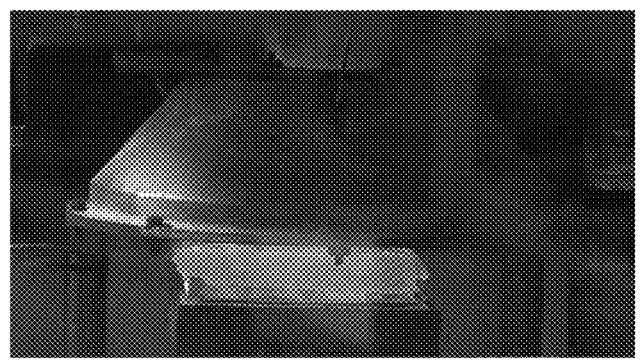
Figure 4C:
Figure 4D:

A total of seven materials from various manufacturers were tested at varying heat fluxes using the ASTM E 1354 cone calorimeter, shown in FIG. 3. The cone calorimeter approach of ASTM E 1354 enables a variety of measurements of a burning sample. Such measurements can include smoke and soot production, oxygen consumption and concentration, ignition delay, mass loss rate, toxic gas production, temperature and pressure of the exhaust gas flow, and effective heat of combustion. The gas analyzer used in typical oxygen consumption calorimetry extracts samples of exhaust gases, scrubs it of combustion products, and determines the oxygen concentration.

The primary principle that makes this test unique is that the heat release rate and heat of combustion can be calculated based on a measure of the oxygen consumed during the combustion process, also known as oxygen consumption calorimetry. Oxygen consumption calorimetry is based on the observation that the net heat of combustion is directly related to the amount of oxygen required for combustion. The relationship is approximately $13.1 \times 10^3$ kJ of heat released per kilogram of oxygen consumed. Specimens in the test are burned in ambient air conditions under exposure to a predetermined external heat flux from the conical radiant heater while the oxygen concentration in the exhaust and sample mass are simultaneously measured and recorded.

Sample materials were subjected to 20, 35, and 50 kW/m$^2$ of radiant heat from the conical heater. 4" square samples were placed on the specimen tray with mineral wool backing and placed under the heater. When pyrolysis vapors began to come off of the sample surface, a pilot igniter was applied. If the specimen was ignited, it was allowed to burn until it consumed the entire sample after which the remainder of the specimen was removed.

Observations were made throughout the course of the experiment to determine the time for the surface of the material to "off-gas", discoloration to occur, thermal degradation (such as curling of corners, swelling, blistering, or effects after ignition), ignition (sustained and non-sustained), and burn-through of the sample. FIG. 4 provides examples of the observed sample behavior.

The behavior of each material was studied under each of the applied heat fluxes. This allowed for a comparison to be made between samples to determine which materials retained structural integrity despite the high heat exposures. Table 2 provides a summary of the prototype materials tested in this study.

TABLE 2

Materials Tested in the Cone Calorimeter

| No. | Material | Model | Color |
|---|---|---|---|
| A | Vermiculite coated fiberglass | Dupre "A" | Red topside, white underside |
| B | Vermiculite coated fiberglass | Dupre "B" | Gray topside, white underside |
| C | High-Temperature Polymer-Coated Fiberglass | NEWTEX Z-Block F-407 | Gray |
| D | Aluminized spun p-aramid yarn | NEWTEX Z-Flex K-270 | Silver reflective top, yellow underside |
| E | Aluminized Core-Spun p-aramid yarn with fiberglass core | NEWTEX Z-Flex K-700 | Silver aluminized top, yellow underside |
| F | Spun Polymer coated KEVLAR | TenCate Arashield Gray | Gray |
| G | Plain weave NOMEX | TenCate Brigade 750 | Red |

Example 1

Material A

| | | Time to Observation (s) | | |
|---|---|---|---|---|
| Material A | | 20 kW/m$^2$ | 35 kW/m$^2$ | 50 kW/m$^2$ |
| Test 1 | Off-gassing | 29 | 18 | 6 |
| | Discoloration | See Below | See Below | See Below |
| | Thermal Degradation | See Below | See Below | See Below |
| | Sustained Ignition | N/A | N/A | N/A |
| | Burn Through | N/A | N/A | N/A |
| | Non-Sustained Ignition | N/A | N/A | 22 (Flash) 31 (Lasts 16 s) |
| Test 2 | Off-gassing | 37 | 14 | 7 |
| | Discoloration | See Below | See Below | See Below |
| | Thermal Degradation | N/A | N/A | N/A |
| | Sustained Ignition | N/A | N/A | N/A |
| | Burn Through | N/A | N/A | N/A |
| | Non-Sustained Ignition | N/A | N/A | 48 (Flash) |

Material A

Figure 5:
FIG. 5 shows a sample of Material A prior to testing.

Material A is a soft, flexible material that is red on top and white on the bottom. FIG. 5 shows a sample of the material prior to testing.

For the tests conducted on Material A, samples labeled "Test 1" were conducted without a thermocouple or anything holding the sample down, whereas samples labeled "Test 2" were conducted with a thermocouple underneath the sample and a rim holding down the edges of the sample.

20 kW/m$^2$ Applied Heat Flux

When the samples are subject to a radiant heat flux of 20 kW/m$^2$, Material A is not affected greatly.

For Test 1, the edges parallel with the grain of the sample curled up slightly toward the radiant heater. For Test 2, the edges of the sample remained stationary/fixed.

Figure 6:
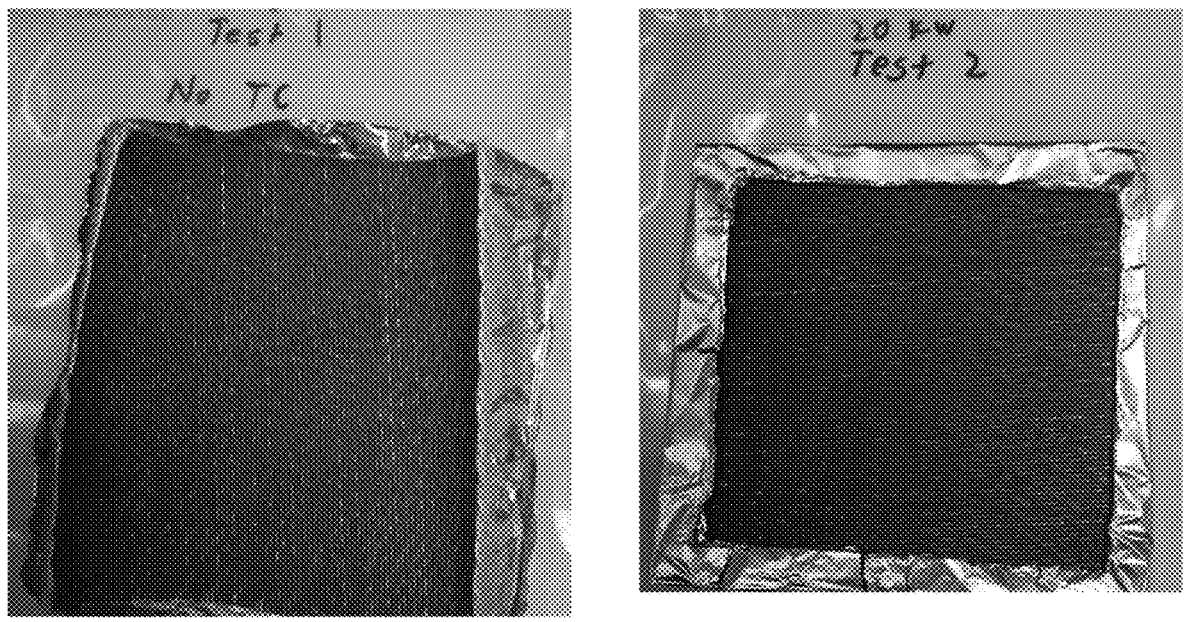
FIG. 6 shows Material A samples after 20 kW/m$^2$ radiant heating (showing Test 1 (left) and Test 2 (right)).

For both Test 1 and Test 2, visible off-gassing was observed. When the samples were being removed from underneath the cone, a purplish tint was observed, but the samples returned to the original reddish color after a few minutes. Both samples felt significantly more rough and appeared less red than prior to being heated. When the samples were moved in a flexible way, they felt slightly less flexible (more rigid) and a "crackling" sound was heard when bent. FIG. 6 shows the state of the samples after being removed from the calorimeter.

35 kW/m$^2$ Applied Heat Flux

Figure 7:
FIG. 7 shows Material A samples after 35 kW/m$^2$ radiant heating (showing Test 1 (left) and Test (right)).

The behaviors observed from heating the samples at 20 kW/m$^2$ were repeated again when heated at 35 kW/m$^2$. A purple tint was observed when the samples were being removed from under the radiant cone. The samples felt slightly rougher and a bit less flexible than the 20 kW/m² samples, but otherwise the samples appear to be the same. FIG. 7 shows the state of the samples after being removed from the calorimeter.

50 kW/m² Applied Heat Flux

At 50 kW/m², the samples were not greatly affected.

For Test 1, the sample off-gasses, curls up towards the radiant cone, and the underside of the sample ignites. The ignition was not a sustained ignition, and it did not appear that the top side of the sample actually ignited. After extinction, the sample flashes for a little bit.

For Test 2, the sample off gasses and flashes once.

For both Test 1 and Test 2, while the samples were being removed from underneath the cone, a purple tint was observed, but the sample returned to its original red color after a few minutes. The Test 1 sample showed some damage from the underside igniting. Both of the samples appeared to be even rougher and less flexible than the 35 kW/m² samples.

Figure 8:
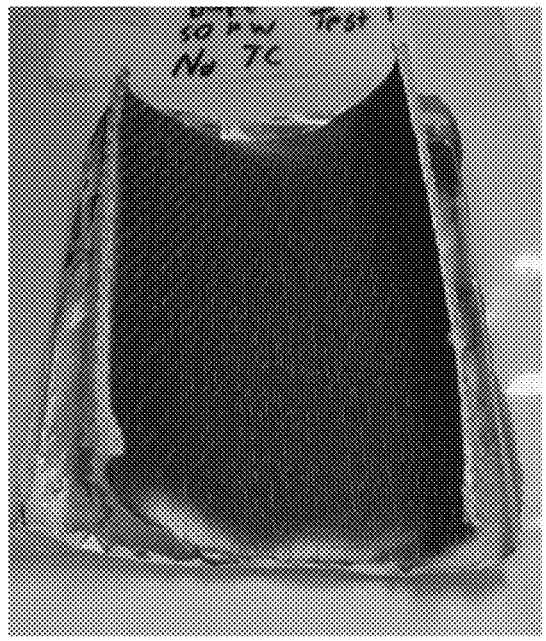
FIG. 8 shows Material A samples after 50 kW/m$^2$ radiant heating (showing Test 1 (left) and Test 2 (right)).
Figure 8:

FIG. 8 shows the state of the samples after being removed from the calorimeter.

Example 2

Material B

| Material B | | Time to Observation (s) | | |
|---|---|---|---|---|
| | | 20 kW/m² | 35 kW/m² | 50 kW/m² |
| Test 1 | Off-gassing | 14 | 9 | 2 |
| | Discoloration | See | See Below | See Below |
| | Thermal Degradation | See | See Below | See Below |
| | Sustained Ignition | N/A | N/A | N/A |
| | Burn Through | N/A | N/A | N/A |
| | Non-Sustained Ignition | N/A | 28 (Lasts 2 s) | 9 (Flash) 16 (Lasts 6 s) |
| Test 2 | Off-gassing | 19 | 9 | 4 |
| | Discoloration | See | See Below | See Below |
| | Thermal Degradation | See | See Below | See Below |
| | Sustained Ignition | N/A | N/A | N/A |
| | Burn Through | N/A | N/A | N/A |
| | Non-Sustained Ignition | N/A | N/A | 16 (Lasts 4 s) |

Material B

Figure 9:
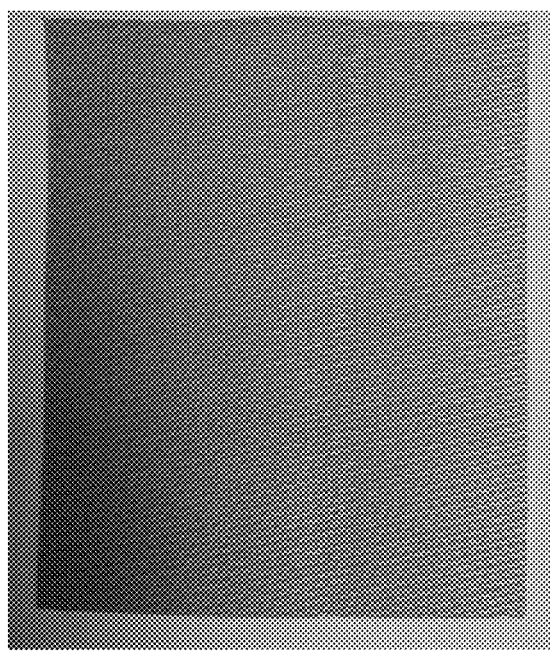
FIG. 9 shows a sample of Material B prior to testing.

Material B is a moderately flexible material that is gray on top and white on the bottom. FIG. 9 shows a sample of the material prior to testing.

For all of the tests conducted for Material B, samples labeled "Test 1" were conducted without a thermocouple or anything holding the sample down, whereas samples labeled "Test 2" were conducted with a thermocouple underneath the sample and a rim holding down the edges of the sample.

20 kW/m² Applied Heat Flux

Figure 10:
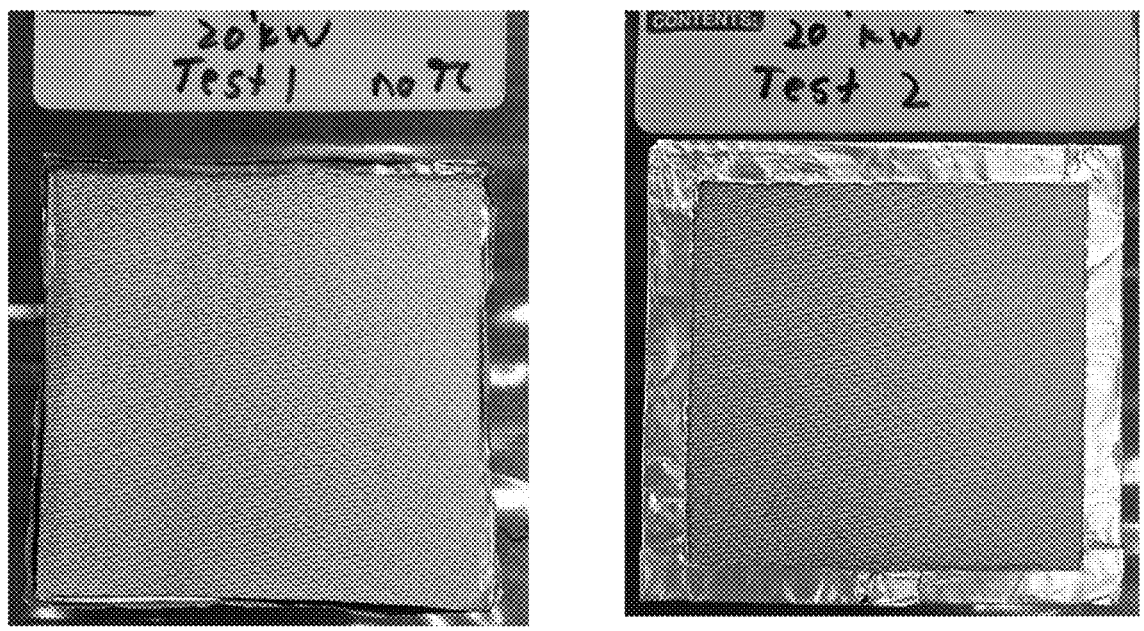
FIG. 10 shows Material B samples after 20 kW/m$^2$ Radiant Heating (showing Test 1 (left) and Test 2 (right)).

At 20 kW/m², Material B was not affected greatly. There was a significant amount of off-gassing in the beginning of both tests. For both tests, the color of the samples changed to a shade of grayish tan on the top and brown on the underside. The dimensions of both samples shrunk slightly from the heating. The samples were more flexible than the original sample. FIG. 10 shows the state of the samples after being removed from the calorimeter.

35 kW/m² Applied Heat Flux

At 35 kW/m², Material B was not seen to be significantly affected by the heating process.

For Test 1, the sample off-gasses a large amount. The sample ignites with a short blue flame for about 2 seconds (not a sustained flame so the sample stayed under the cone). After the flame self-extinguishes, the off-gassing stops shortly after, and the corners begin to curl up slightly.

For Test 2, the sample also off gasses a large amount, but the sample does not ignite. The center of the sample rises slightly.

For both the tests, the samples become a lighter gray color than the original sample on the exposed side, and a darker shade on the underside (not as dark as for the 20 kW/m² samples). The dimensions of the samples shrunk slightly due to the heating and the samples were found to be more flexible than their original state.

Figure 11:
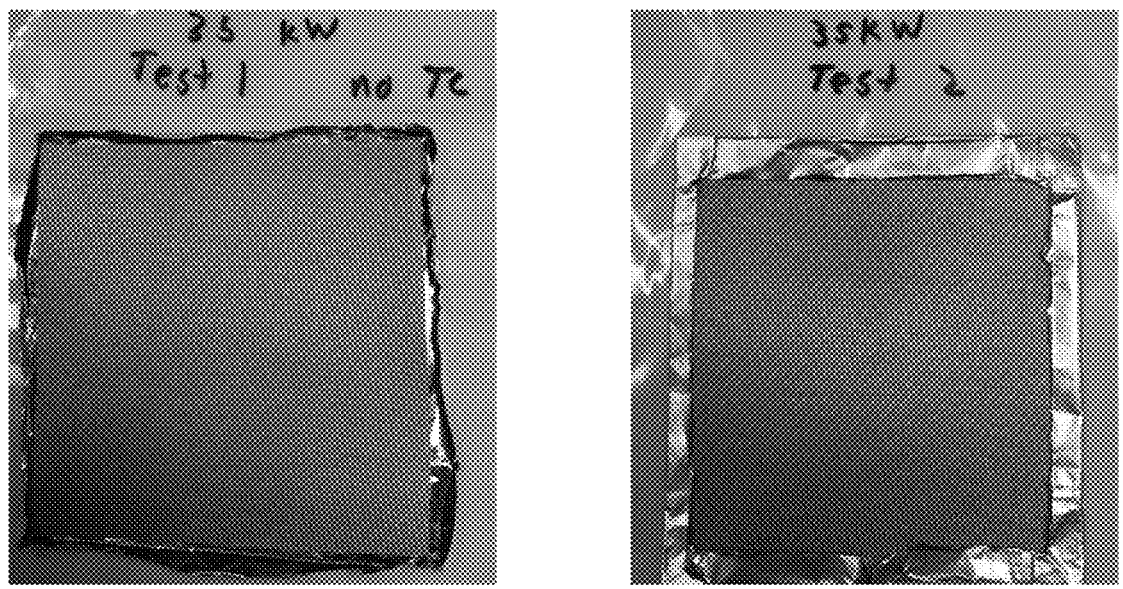
FIG. 11 shows Material B samples after 35 kW/m$^2$ radiant heating (showing Test 1 (left) and Test 2 (right)).

FIG. 11 shows the state of the samples after being removed from the calorimeter.

50 kW/m² Applied Heat Flux

At 50 kW/m², Material B did not show significant effects due to heating.

For Test 1 and Test 2, the sample offgasses a large amount. The sample ignites with a short blue and yellow flame (larger than in the 35 kW/m² test) for about 3 seconds (not a sustained flame so the sample stayed under the cone).

For Test 1, after the flame extinguishes, the off-gassing stops shortly after, and the corners begin to curl up slightly.

For Test 2, after the flame extinguishes, the off-gassing continues for longer than previously, but it still stops within a minute. The center of the sample rises slightly.

For both the tests, the samples become a lighter gray than the original sample or any of the lower heat fluxes on the exposed side, and the samples have attained a light yellowish tint on the underside (almost the same shade as the original sample). The dimensions of the samples have shrunk slightly and the samples are more flexible than the original samples.

Figure 12:
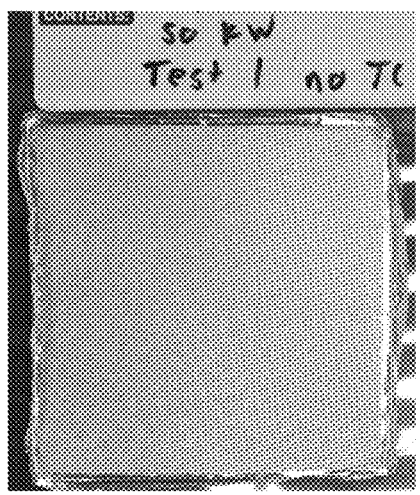
FIG. 12 shows Material B samples after 50 kW/m$^2$ radiant heating (showing Test 1 left) and Test 2 (right)).
Figure 12:
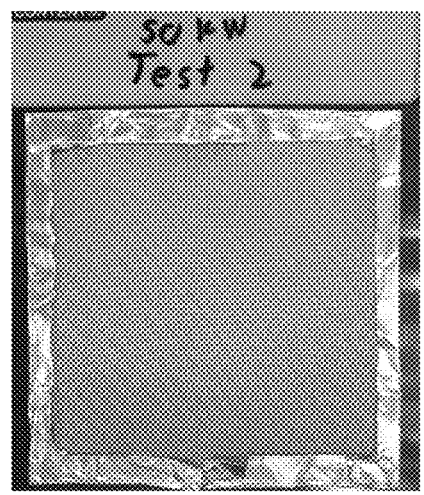

FIG. 12 shows the state of the samples after being removed from the calorimeter.

Example 3

Material C

| Material C | | Time to Observation (s) | | |
|---|---|---|---|---|
| | | 20 kW/m² | 35 kW/m² | 50 kW/m² |
| Test 1 | Off-gassing | 6 | 3 | 1 |
| | Discoloration | See Below | 8, 37 (See Below) | 4, 12 (See Below) |
| | Thermal Degradation | N/A | N/A | N/A |
| | Sustained Ignition | N/A | N/A | N/A |
| | Burn Through | N/A | N/A | N/A |
| | Non-Sustained Ignition | N/A | 7 (Flash) 9 (Lasts 6 s) | 4 (Flash) 5 (Lasts 10 s) |
| Test 2 | Off-gassing | 5 | 3 | 1 |
| | Discoloration | See Below | 7, 30 (See Below) | 3, 11 (See Below) |
| | Thermal Degradation | N/A | N/A | N/A |
| | Sustained Ignition | N/A | N/A | N/A |

-continued

|  | | Time to Observation (s) | |
|---|---|---|---|
| Material C | 20 kW/m² | 35 kW/m² | 50 kW/m² |
| Test 3 Burn Through | N/A | N/A | N/A |
| Non-Sustained Ignition | N/A | 9 (Lasts 7 s) | 3 (Flash) 4 (Lasts 5 s) |
| Off-gassing | 5 | 3 | 1 |
| Discoloration | See Below | 6, 49 (See Below) | 6, 18 (See Below) |
| Thermal Degradation | N/A | N/A | N/A |
| Sustained Ignition | N/A | N/A | N/A |
| Test 4 Burn Through | N/A | N/A | N/A |
| Non-Sustained Ignition | N/A | 6, 15 (Flash) | 4, 7 (Flash) 10 (Lasts 2 s) |
| Off-gassing | 3 | 3 | 1 |
| Discoloration | | 7, 34 (See Below) | 6, 15 (See Below) |
| Thermal Degradation | | N/A | N/A |
| Sustained Ignition | | N/A | N/A |
| Burn Through | | N/A | N/A |
| Non-Sustained Ignition | | 15 (Flash) | 3 (Flash) 6 (Lasts 4 s) |

Material C

Figure 13:
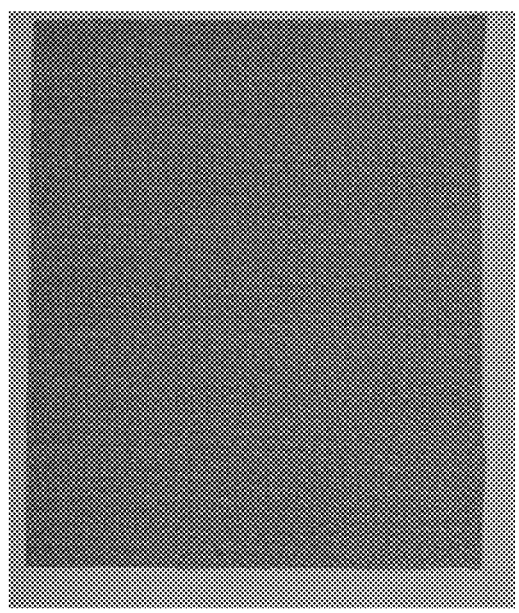
FIG. 13 shows a sample of Material C prior to testing.

Material C is a soft, flexible material that is gray on both the top and the bottom. FIG. 13 shows a sample of the material prior to testing.

For all of the tests conducted for Material C, samples labeled "Test 1" or "Test 2" were conducted without a thermocouple or anything holding the sample down, whereas samples labeled "Test 3" or "Test 4" were conducted with a thermocouple underneath the sample and a rim holding down the edges of the sample.

20 kW/m² Applied Heat Flux

At 20 kW/m², the main change observed was a discoloration of the test samples. Significant off-gassing occurred in the beginning of each test and due to the amount of off-gassing, it is difficult to discern precisely when the discoloration occurred. Due to the heating, the samples turned black and then started to turn white at some point during the test. Once removed from under the cone, they retained the same flexibility, but the samples audibly stretch when bent slightly.

Figure 14:
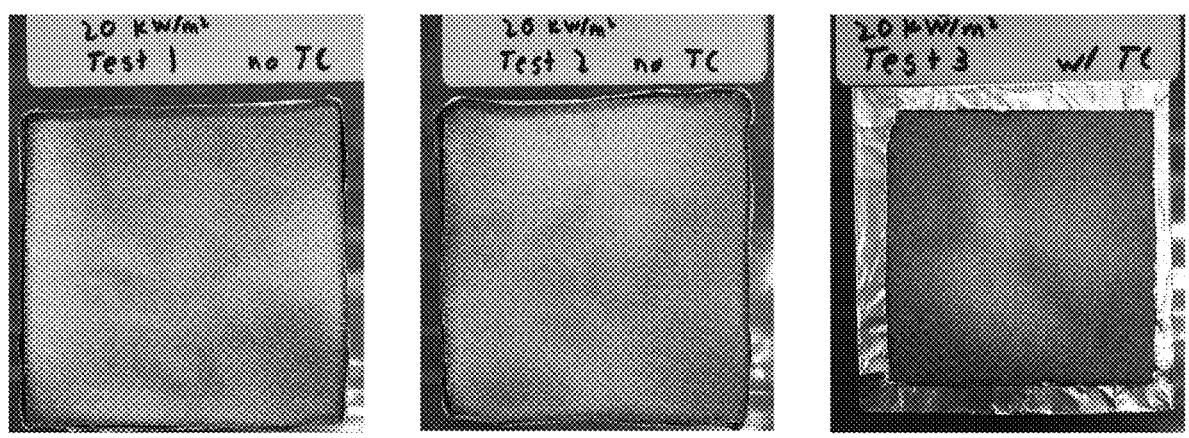
FIG. 14 shows Material C samples after 20 kW/m$^2$ radiant heating (showing Test 1 (left), Test 2 (center), and Test 3 (right)).

FIG. 14 shows the state of the samples after being removed from the calorimeter.

35 kW/m² Applied Heat Flux

At 35 kW/m², the main effect from heating is material discoloration. There is a large amount of off-gassing in the beginning of each test.

For Test 1, the sample flashes, ignites for 6 seconds, and then self-extinguishes. The sample turned black at 8 seconds and began to fade to white at 37 seconds.

For Test 2, the sample ignites for 7 seconds and then self-extinguishes. The sample turned black at 7 seconds and then began to fade to white at 30 seconds.

The off-gassing stopped at approximately the same time as when the flame self-extinguished in Tests 1 and 2.

For Test 3, the sample flashed a couple times and continued to offgas for about a minute. The sample turned black at 8 seconds, and then began to fade to white at 49 seconds (shortly after flashing ceased).

For Test 4, the sample flashed multiple times and then continued to offgas for about a minute. The sample turned black at 7 seconds, and then began to fade to white at 34 seconds (shortly after the flashes).

For all 4 tests, the samples are white on the top and bottom of the samples after they were removed from under the cone. They retained the same flexibility, but the samples audibly stretch when bent slightly. A white powder residue comes off of the samples when touched.

Figure 15:
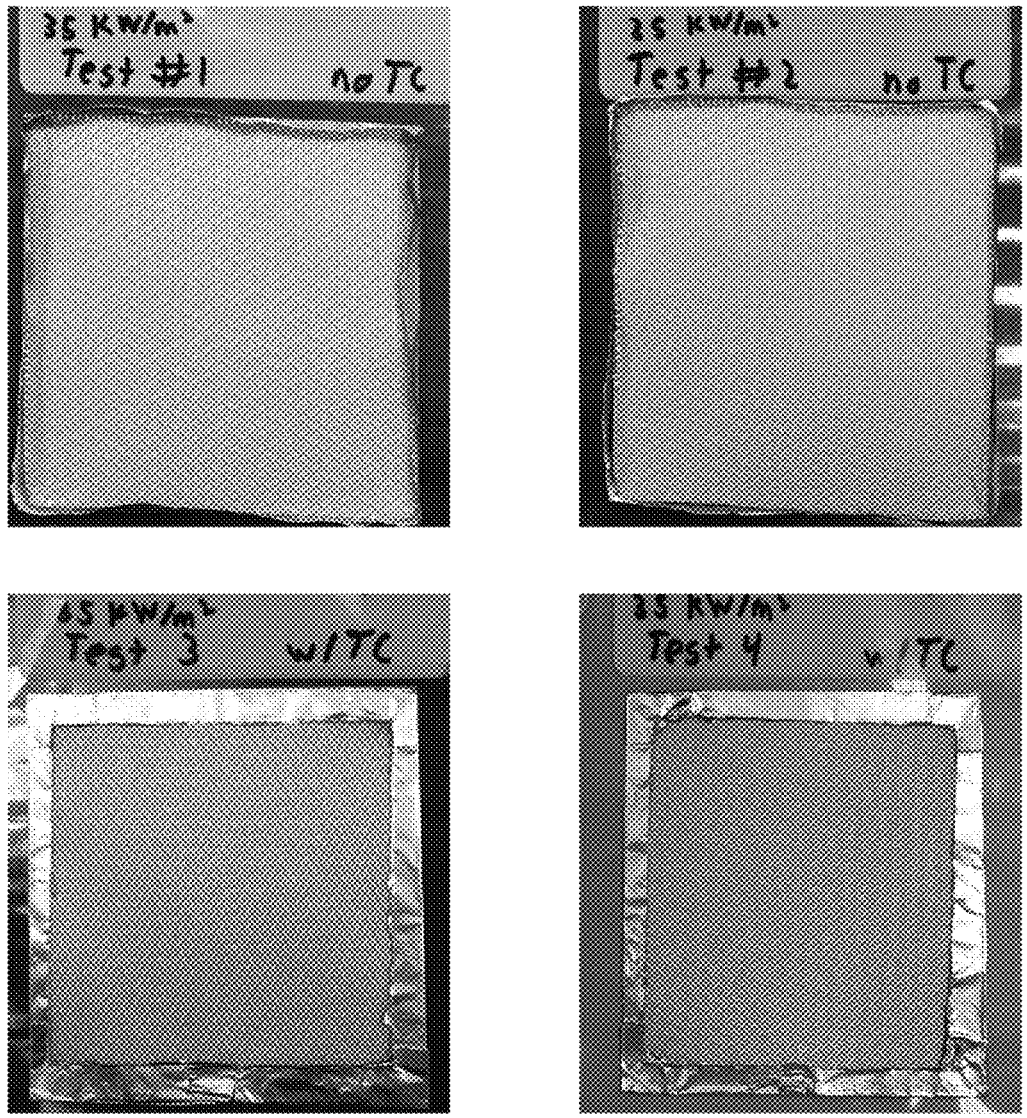
FIG. 15 shows Material C samples after 35 kW/m$^2$ radiant heating (showing Test 1 (top left), test 2 (top right), test 3 (bottom left), and test 4 (bottom right).

FIG. 15 shows the state of the samples after being removed from the calorimeter.

50 kW/m² Applied Heat Flux

At 50 kW/m², the main effect from heating is material discoloration. A significant amount of off-gassing occurs in the beginning of each test.

For Test 1, the sample flashes, ignites for 10 seconds, and then self-extinguishes. The sample turns black at 4 seconds and begins to fade to white at 12 seconds.

For Test 2, the sample flashes, ignites for 5 seconds, and extinguishes. The sample turns black at 3 seconds and begins to fade to white at 11 seconds. The off-gassing stops about when the flame extinguishes for both Test 1 and Test 2.

For Test 3, the sample flashes a couple times, ignites for 2 seconds, and continues to off-gas for about a minute. The sample turns black at 6 seconds, and it begins to fade to white at 18 seconds (shortly after extinguishment).

For Test 4, the sample flashes, ignites for 4 seconds, and continues to off-gas for about a minute. The sample turns black at 6 seconds and begins to fade to white at 15 seconds (shortly after ignition).

For all 4 tests, the samples are white on the top and bottom of the samples after they were removed from under the cone. They retained the same flexibility, but audibly stretch when bent slightly. A white powder reside comes off of the samples when touched.

Figure 16:
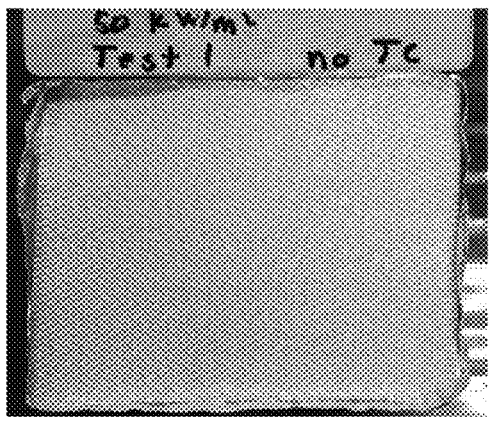
FIG. 16 shows Material C samples after 50 kW/m$^2$ radiant heating (showing Test 1 (top left), Test 2 (top right), Test 3 (bottom left), and Test 4 (bottom right)).
Figure 16:
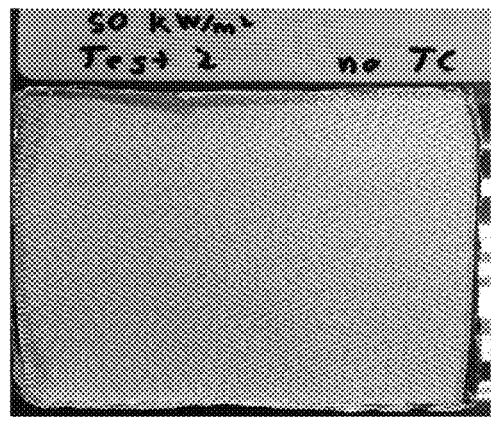
Figure 16:
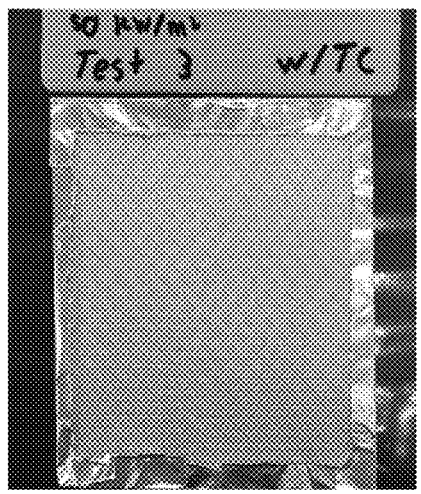
Figure 16:
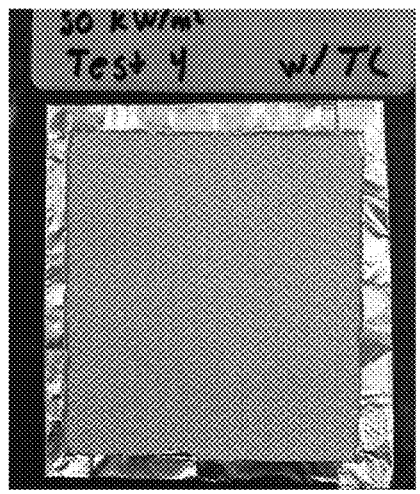

FIG. 16 shows the state of the samples after being removed from the calorimeter.

Example 4

Material D

|  | | Time to Observation (s) | |
|---|---|---|---|
| Material D | 20 kW/m² | 35 kW/m² | 50 kW/m² |
| Test 1 Off-gassing | N/A | N/A | See Below |
| Discoloration | N/A | See Below | See Below |
| Thermal Degradation | N/A | See Below | ~954 (See Below) |
| Sustained Ignition | N/A | N/A | N/A |
| Burn Through | N/A | N/A | >900 (See Below) |
| Non-Sustained Ignition | N/A | N/A | N/A |
| Test 2 Off-gassing | N/A | N/A | 32 |
| Discoloration | N/A | See Below | See Below |
| Thermal Degradation | N/A | See Below | ~540 (See Below) |
| Sustained Ignition | N/A | N/A | N/A |
| Burn Through | N/A | N/A | >500 (See Below) |
| Non-Sustained Ignition | N/A | N/A | N/A |
| Test 3 Off-gassing | N/A | N/A | 192 |
| Discoloration | N/A | See Below | ~260 (See Below) |

-continued

| | | Time to Observation (s) | |
|---|---|---|---|
| Material D | 20 kW/m² | 35 kW/m² | 50 kW/m² |
| Thermal Degradation | N/A | See Below | >1620 (See Below) |
| Sustained Ignition | N/A | N/A | N/A |
| Burn Through | N/A | N/A | See Below |
| Non-Sustained Ignition | N/A | N/A | 1642 (Flash) 1647 (Lasts 44 s) |
| Test 4 Off-gassing | | N/A | 150 |
| Discoloration | | See Below | ~200 (See Below) |
| Thermal Degradation | | See Below | >1500 |
| Sustained Ignition | | N/A | N/A |
| Burn Through | | N/A | See Below |
| Non-Sustained Ignition | | N/A | N/A |

Material D

Figure 17:
FIG. 17 shows a sample of Material D prior to testing.

Material D is a flexible material that is smooth and reflective on top and soft and yellow on the bottom. FIG. 17 shows a sample of the material prior to testing.

For all of the tests conducted for Material D, samples labeled "Test 1" or "Test 2" were conducted without a thermocouple or anything holding the sample down, whereas samples labeled "Test 3" or "Test 4" were conducted with a thermocouple underneath the sample and a rim holding down the edges of the sample.

20 kW/m² Applied Heat Flux

At 20 kW/m², no significant changes to the sample were observed. It feels and looks exactly the same as the original sample after it is removed from the cone calorimeter.

Figure 18:
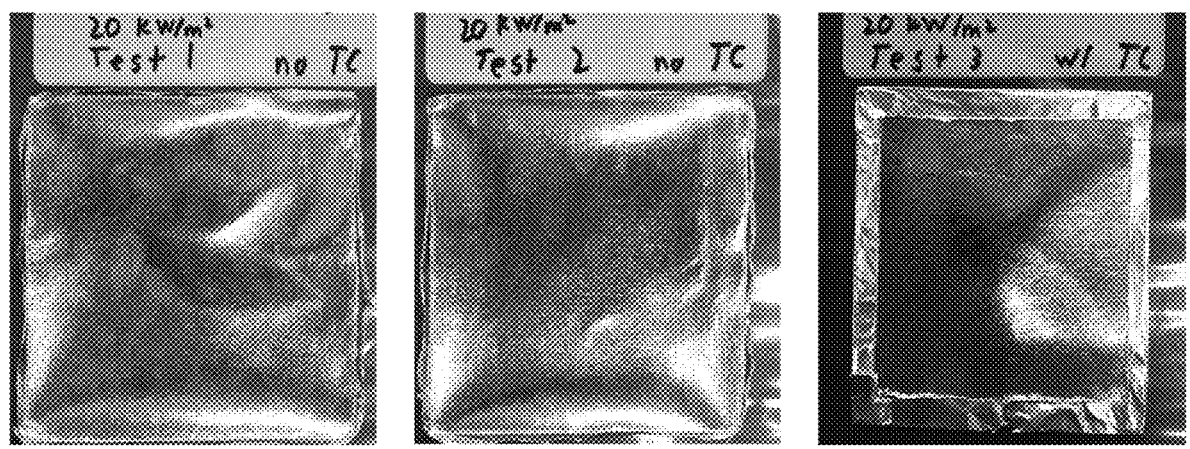
FIG. 18 shows Material D samples after 20 kW/m$^2$ radiant heating (showing Test 1 (left), Test 2 (center), and Test 3 (right)).

FIG. 18 shows the state of the samples after being removed from the calorimeter.

35 kW/m² Applied Heat Flux

At 35 kW/m², the samples do not appear to be greatly affected by the heating process.

For Test 1, the sample appeared to be exactly the same except the edges curled slightly toward the cone heater.

For Test 3 and Test 4, the center of the sample appeared to be exactly the same except for the appearance of the center inflating. The samples from Test 3 and Test 4, have a little discoloration on the edges of the sample.

Once removed from under the cone, the sample from Test 1 feels exactly the same as the sample before the test. Underneath the foil, the sample turned golden on the edges, cracks audibly, and feels more rigid when bent. However, for Test 3 and Test 4, these effects can mostly likely be attributed to the cover pressing down on the sample and heating the sample faster.

Figure 19:
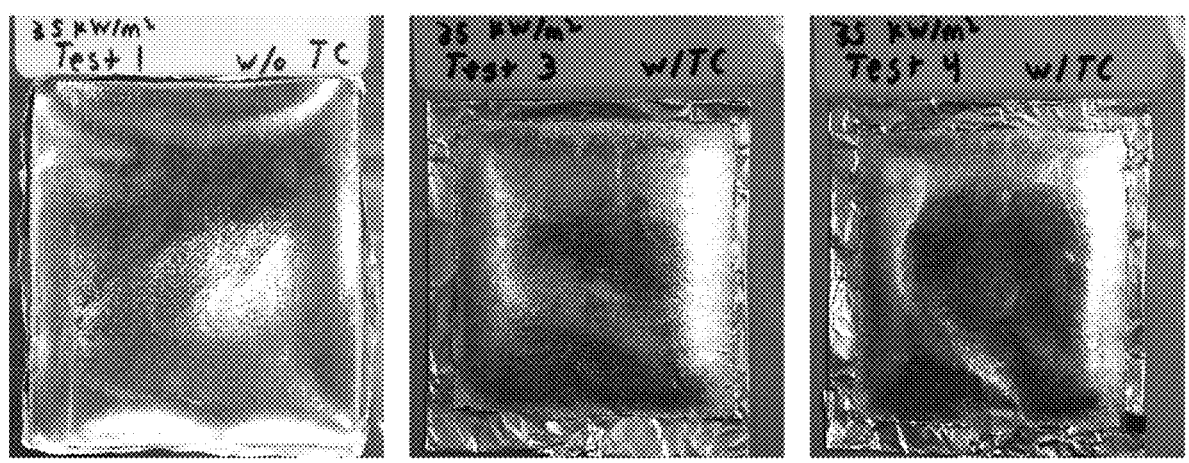
FIG. 19 shows Material D samples after 35 kW/m$^2$ radiant heating (showing Test 1 (left), Test 3 (center), and Test 4 (right) samples).

FIG. 19 shows the state of the samples after being removed from the calorimeter.

50 kW/m² Applied Heat Flux

Applying a heat flux of 50 kW/m² greatly impacted the samples.

Each of the tests began with the sample off-gassing a small amount. The edges began to dry and lose reflectiveness about 4 or 5 minutes into the test. For Test 1, the corners started to curl up towards the cone after about 11 minutes. At approximately 16 minutes, the sample was curled up close enough to the cone that the tip glows red hot, and it begins to deteriorate as the glow spreads across the sample. A pile of ash dispersed thinly across the foil is all that remained of the sample. Since this process of thermal degradation happened over an extended period of time, it is challenging to define when it actually began and when burn through was achieved.

For Test 2, the corners started to curl up after about 7 minutes, and the samples corners began to glow at about 9 minutes. Otherwise, Test 2 acted the same way as Test 1.

For Test 3, since the edges are covered, the likelihood of the initial off-gassing originating from the underside of the sample is reduced. The sample began to lose reflectiveness and dry at around 5 minutes, and by 13 minutes all reflectiveness is gone. The sample began to rise in the center at about 26 minutes and caught fire at approximately 28 minutes. After the fire self-extinguishes, the entire sample is glowing red hot and has deteriorated as observed in Test 1 and Test 2.

For Test 4, the sample begins to offgas, then starts to lose reflectiveness and dry at around 4 minutes. All reflectiveness is gone by 12 minutes. The sample does not catch fire like in Test 3, but it does start to deteriorate at around the same time. By the end of the test, the samples for both Test 3 and Test 4 have almost fully deteriorated and made a hole through the foil as well.

Figure 20:
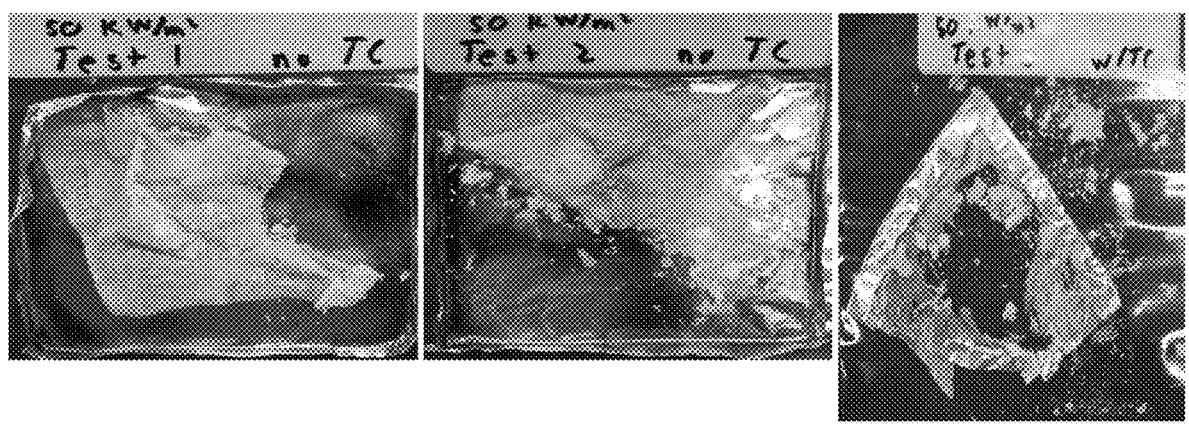
FIG. 20 shows Material D samples after 50 kW/m$^2$ radiant heating (showing Test 1 (left), Test 2 (center), and Test 3 (right)).

FIG. 20 shows the state of the samples after being removed from the calorimeter.

Example 5

Material E

| | | Time to Observation (s) | | |
|---|---|---|---|---|
| | Material E | 20 kW/m² | 35 kW/m² | 50 kW/m² |
| Test 1 | Off-gassing | N/A | N/A | 11 |
| | Discoloration | N/A | N/A | (See Below) |
| | Thermal Degradation | N/A | N/A | >1200 (See Below) |
| | Sustained Ignition | N/A | N/A | N/A |
| | Burn Through | N/A | N/A | N/A |
| | Non-Sustained Ignition | N/A | N/A | N/A |
| Test 2 | Off-gassing | N/A | N/A | 12 |
| | Discoloration | N/A | N/A | (See Below) |
| | Thermal Degradation | N/A | N/A | >1080 (See Below) |
| | Sustained Ignition | N/A | N/A | N/A |
| | Burn Through | N/A | N/A | N/A |
| | Non-Sustained Ignition | N/A | N/A | N/A |
| Test 3 | Off-gassing | N/A | N/A | 55 |
| | Discoloration | N/A | See Below | ~180 (See Below) |
| | Thermal Degradation | N/A | N/A | See Below |
| | Sustained Ignition | N/A | N/A | N/A |
| | Burn Through | N/A | N/A | N/A |
| | Non-Sustained Ignition | N/A | N/A | N/A |
| Test 4 | Off-gassing | | N/A | 56 |
| | Discoloration | | See Below | ~180 (See Below) |
| | Thermal Degradation | | N/A | ~1320 (See Below) |
| | Sustained Ignition | | N/A | N/A |
| | Burn Through | | N/A | N/A |
| | Non-Sustained Ignition | | N/A | N/A |

Material E

Figure 21:
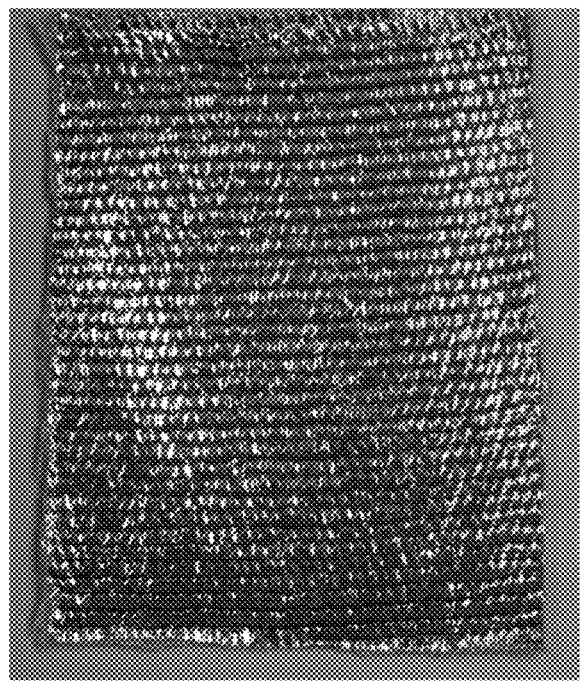
FIG. 21 shows a sample of Material E prior to testing.

Material E is a flexible material that is silver aluminum thermal sheeting on the top and woven yellow on the bottom. FIG. 21 shows a sample of the material prior to testing.

For all of the tests conducted for Material E, samples labeled "Test 1" or "Test 2" were conducted without a thermocouple or anything holding the sample down, whereas samples labeled "Test 3" or "Test 4" were conducted with a thermocouple underneath the sample and a rim holding down the edges of the sample.

20 kW/m² Applied Heat Flux

At 20 kW/m² (the samples below), none of the samples appear to be affected. It felt and looked exactly the same as the original once it was removed from the cone calorimeter.

Figure 22:
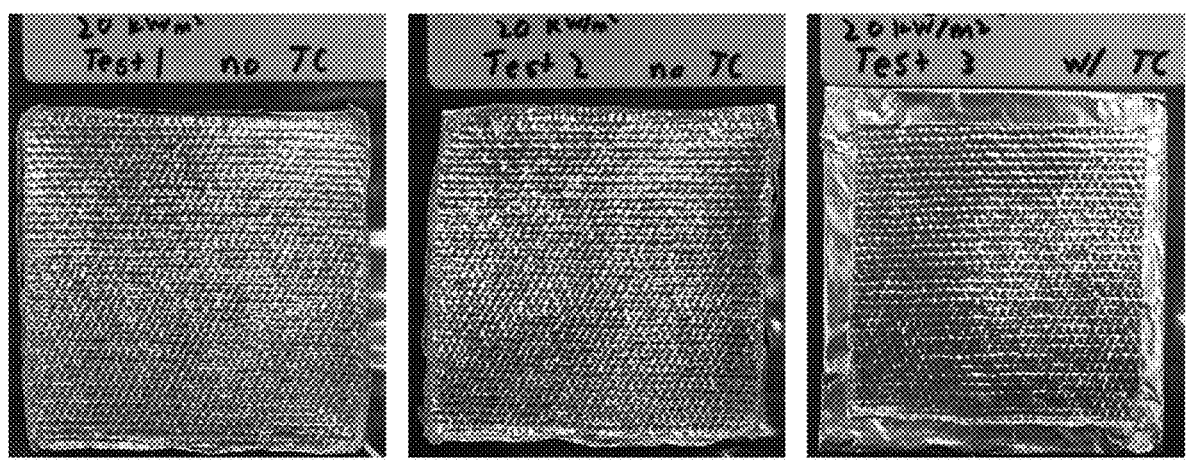
FIG. 22 shows Material E samples after 20 kW/m$^2$ radiant heating (showing Test 1 (left), Test 2 (center), and Test 3 (right)).

FIG. 22 shows the state of the samples after being removed from the calorimeter.

35 kW/m² Applied Heat Flux

At 35 kW/m², the samples do not appear to be greatly affected.

For Test 1 and Test 2, the samples appear to be exactly the same except for the edges being slightly discolored, curled up slightly, and a bit more rigid than the original sample.

For Test 3 and Test 4, the centers of the samples appear to be exactly the same as the original sample. However, towards the edges of the sample, they have lost reflectiveness and color, and are more rigid than the original sample.

Figure 23:
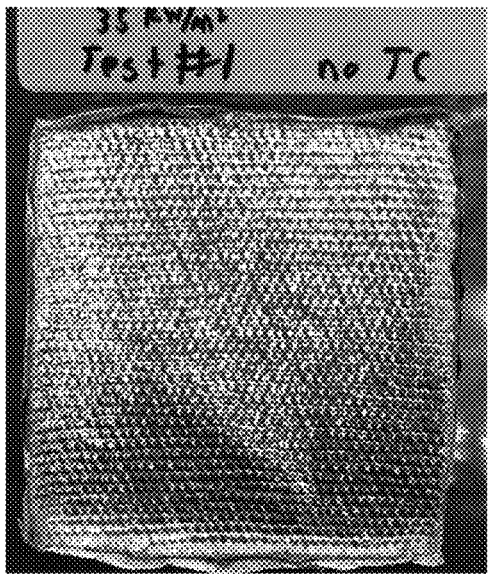
FIG. 23 shows Material E samples after 35 kW/m$^2$ radiant heating (showing Test 1 (top left), Test 2 (top right), Test 3 (bottom left), and Test 4 (bottom right)).
Figure 23:
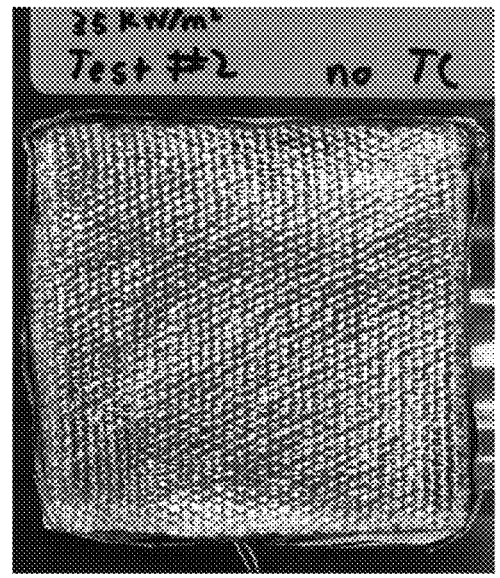
Figure 23:
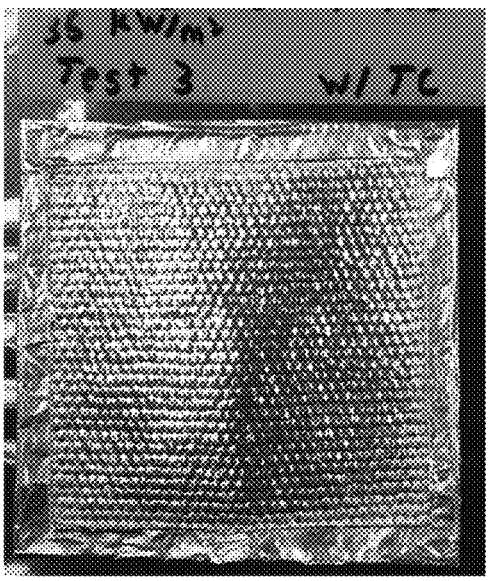
Figure 23:
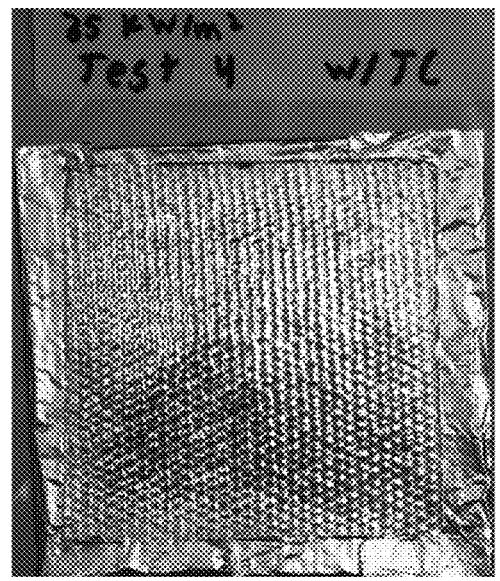

FIG. 23 shows the state of the samples after being removed from the calorimeter.

50 kW/m² Applied Heat Flux

At 50 kW/m², the samples changed significantly over the course of the tests.

For Test 1 and 2, off-gassing began fairly quickly because of the exposed edges. The edges started to lose reflectiveness some point before thermal degradation, but it is difficult to pinpoint the precise moment at which this occurred. Approximately 18 to 20 minutes into the test, the reflective layer on top started to peel away to reveal the woven layer underneath. When removed from the cone calorimeter, Test l's sample was about 50% of the ashy-woven layer and 50% of the reflective material. For Test 2, the sample was about 75% of the ashy-woven layer and 25% of the reflective material.

For Test 3 and Test 4, since the edges were covered, the possibility that the initial off-gassing comes from the underside of the sample was reduced. The edges began to lose reflectiveness some point before thermal degradation, but it is challenging to pinpoint the exact moment when discoloration happens.

For Test 3, it does not appear like the sample has degraded except for a small patch starting to once the sample is removed from under the cone. The rest of the sample lost reflectiveness and changed to a slightly more gold color.

For Test 4, the process of becoming ash starts to spread across the sample at about 22 minutes, and when the sample is removed from under the cone, the ash layer peels away so that the ashy-woven layer remains.

Figure 24:
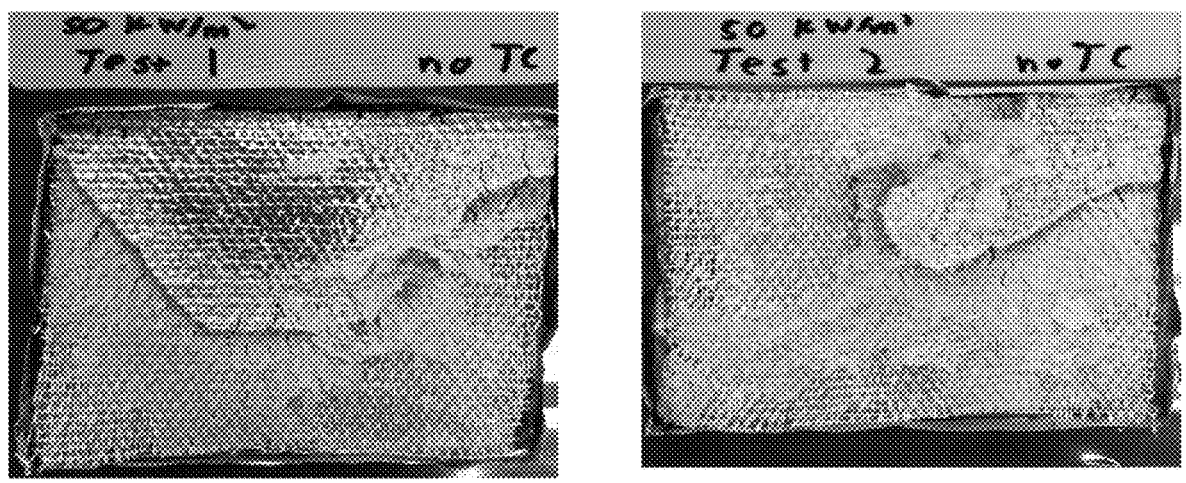
FIG. 24 shows Material E samples after 50 kW/m$^2$ radiant heating (showing Test 1 (left) and Test 2 (right)).

FIG. 24 shows the state of the samples after being removed from the calorimeter.

Example 6

Material F

| | | Time to Observation (s) | | |
| --- | --- | --- | --- | --- |
| Material F | | 20 kW/m² | 35 kW/m² | 50 kW/m² |
| Test 1 | Off-gassing | | 5 | 2 |
| | Discoloration | | 15 | 9 |
| | Thermal Degradation | | 7 | 4 |
| | Sustained Ignition | | N/A | 14 |
| | Burn Through | | See Below | See Below |
| | Non-Sustained Ignition | | 35 (Lasts 37 s) | N/A |
| Test 2 | Off-gassing | | 5 | 2 |
| | Discoloration | | 14 | 7 |
| | Thermal Degradation | | 7 | 4 |
| | Sustained Ignition | | 11 | 7 |
| | Burn Through | | See Below | See Below |
| | Non-Sustained Ignition | | N/A | 7 (Flash) |

Material F

Figure 25:
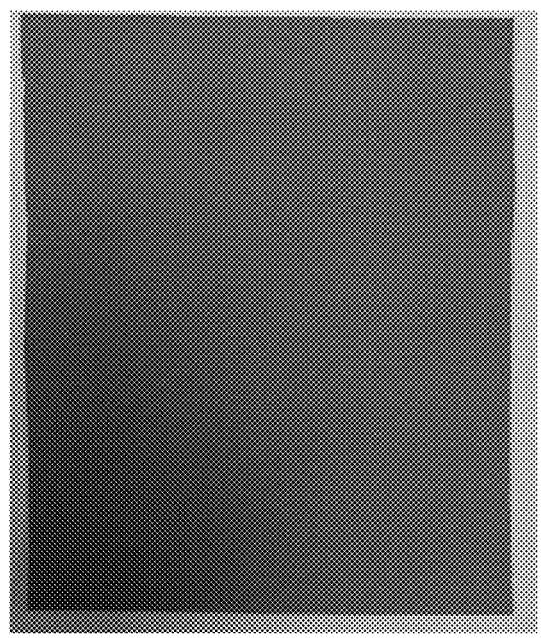
FIG. 25 shows a sample of Material F prior to testing.

Material F is a rubbery, flexible material that is gray on both the top and bottom. FIG. 25 shows a sample of the material prior to testing.

For all of the tests conducted for Material F, samples labeled "Test 1" or "Test 2" were conducted without a thermocouple or anything holding the sample down, whereas samples labeled "Test 3" or "Test 4" were conducted with a thermocouple underneath the sample and a rim holding down the edges of the sample.

35 kW/m² Applied Heat Flux

At 35 kW/m², the samples for both Test 1 and Test 2 began off-gassing profusely almost immediately and then they roll up, so the igniter must be taken out. The samples changed color from gray to black.

For Test 1, after waiting a bit, the igniter is reinserted, and the sample ignites immediately. For Test 2, the igniter is inserted more quickly, and the sample still ignites immediately, but the igniter drags the sample on the way back out. Burn through cannot be considered because the sample rolls up. Once the samples self-extinguished, they continued to lose mass under the cone until only ash remained.

Figure 26:
FIG. 26 shows Material F samples after 35 kW/m$^2$ radiant heating (showing Test 1 (top) and Test 2 (bottom)).
Figure 26:
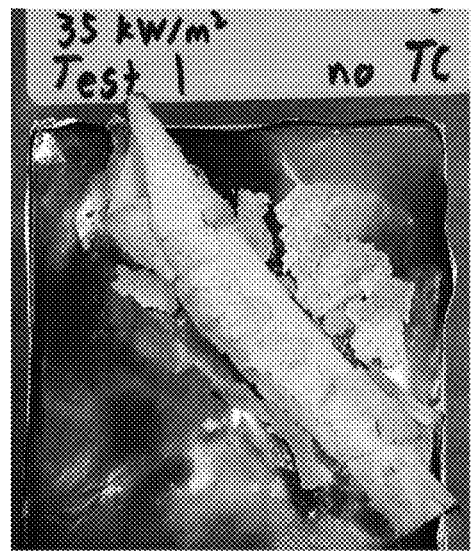
Figure 26:
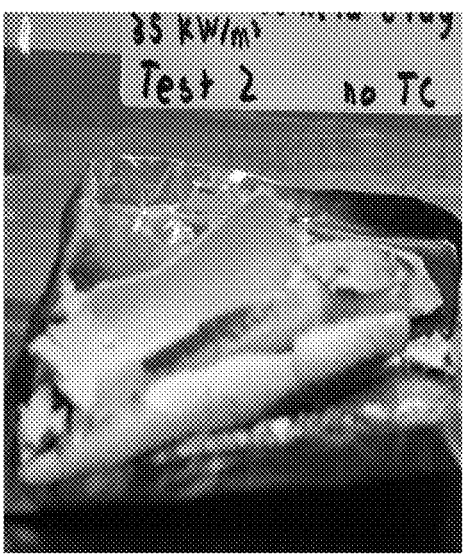
Figure 26:
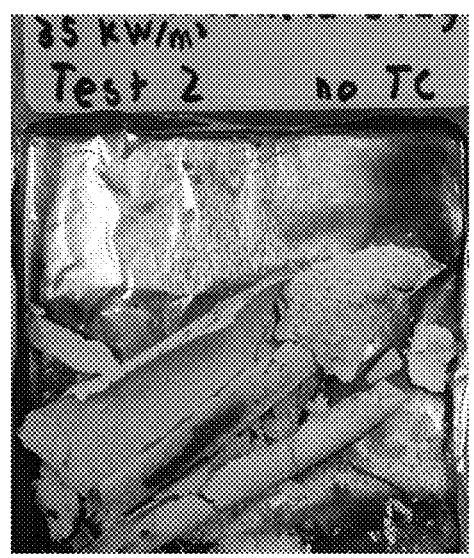

FIG. 26 shows the state of the samples after being removed from the calorimeter.

50 kW/m² Applied Heat Flux

At 50 kW/m², the samples for both Test 1 and Test 2 began off-gassing profusely almost immediately and then they roll up, so the igniter must be removed. The samples changed color from gray to black.

Figure 27:
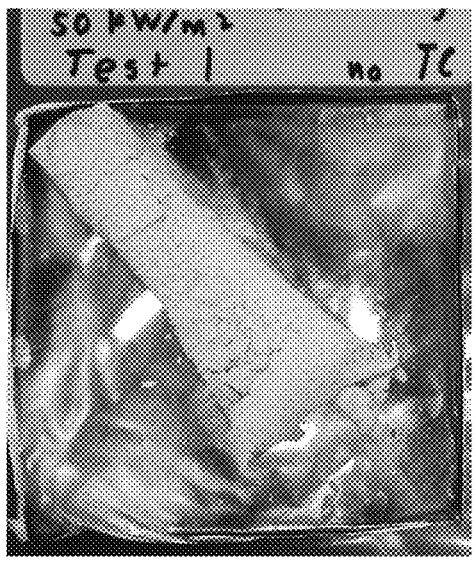
FIG. 27 shows material F samples after 50 kW/m$^2$ radiant heating (showing Test 1 (top) and Test 2 (bottom)).
Figure 27:
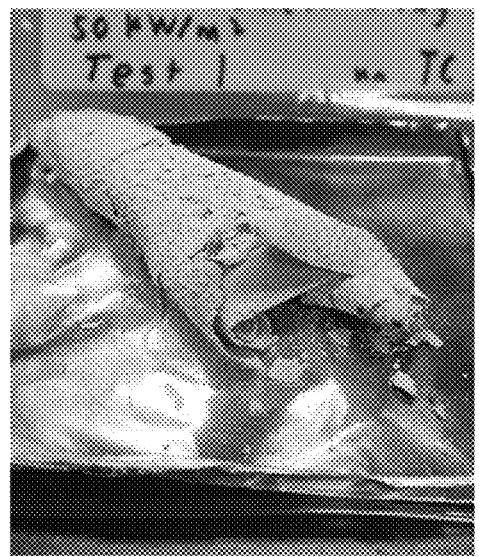
Figure 27:
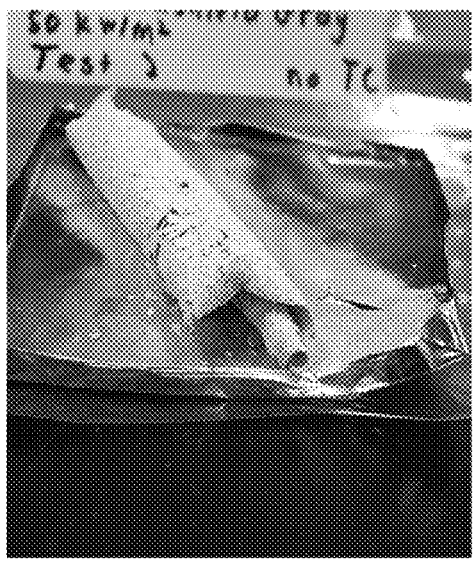
Figure 27:

For Test 1 and Test 2, the igniter does not have to be reinserted for the sample to ignite. Burn through cannot be determined because the sample rolls up. Once the sample self-extinguished, it continued to lose mass under the cone until only ash remained FIG. 27 shows the state of the samples after being removed from the calorimeter.

Example 7

Material G

| Material G | | Time to Observation (s) | | |
|---|---|---|---|---|
| | | 20 kW/m² | 35 kW/m² | 50 kW/m² |
| Test 1 | Off-gassing | | 3 | 3 |
| | Discoloration | | 7 | 4 |
| | Thermal Degradation | | 7 | 4 |
| | Sustained Ignition | | N/A | N/A |
| | Burn Through | | See Below | See Below |
| | Non-Sustained Ignition | | 7 (Lasts 24 s) | 4 (Lasts 40 s) |
| Test 2 | Off-gassing | | 3 | 1 |
| | Discoloration | | 6 | 4 |
| | Thermal Degradation | | 5 | 2 |
| | Sustained Ignition | | 6 | N/A |
| | Burn Through | | See Below | See Below |
| | Non-Sustained Ignition | | N/A | 4 (Lasts 20 s) |

Material G

Figure 28:
FIG. 28 shows a sample of Material G prior to testing.

Material G is a cloth-like material that is red on both the top and bottom. FIG. 28 shows a sample of the material prior to testing.

For all of the tests conducted for Material G, the samples did not have a thermocouple placed underneath the sample or use a rim to hold down the edges of the sample.

35 kW/m² Applied Heat Flux

At 35 kW/m², the samples for both Test 1 and Test 2 began off-gassing profusely, crumpled up towards the cone, and ignited almost immediately. The discoloration, thermal degradation, and ignition all happened almost simultaneously. The sample degraded to a very small crumpled up black sample by the time it was taken out from under the cone. Burn-through could not be determined as the sample crumpled up.

Figure 29:
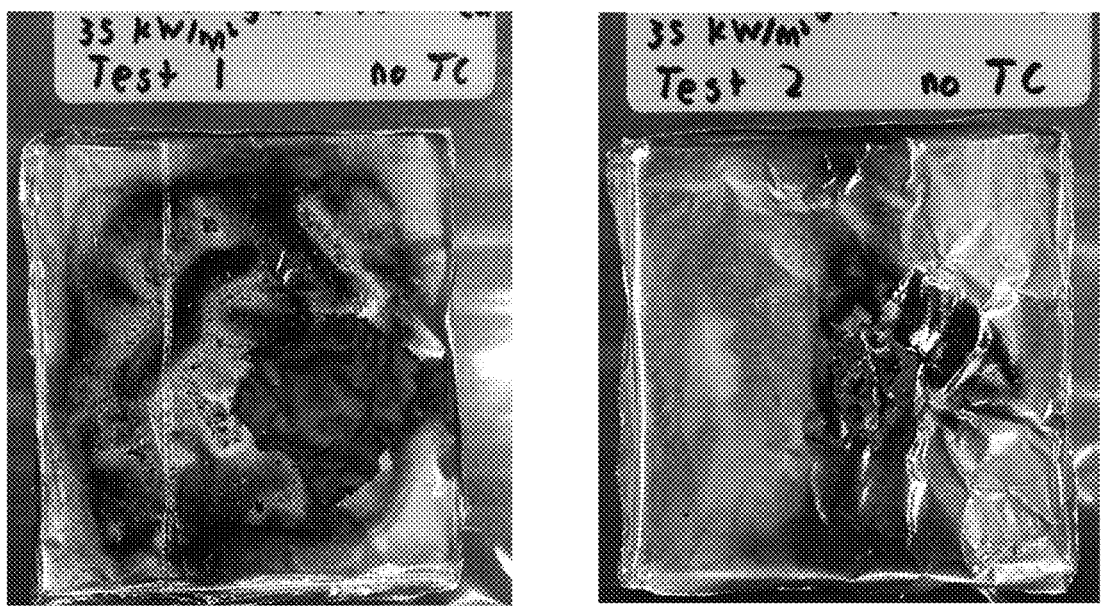
FIG. 29 shows Material G samples after 35 kW/m² radiant heating (showing Test 1 (left) and Test 2 (right)).

FIG. 29 shows the state of the samples after being removed from the calorimeter.

50 kW/m² Applied Heat Flux

At 50 kW/m², the samples for both Test 1 and Test 2 begin off-gassing profusely, crumple up towards the cone, and ignited almost immediately. The discoloration, thermal degradation, and ignition all happened almost simultaneously. The sample degraded to very small specks of ash by the time the sample is removed from the calorimeter. Burn-through could not be determined due to the sample crumpling up during the heating process.

Figure 30:
FIG. 30 shows Material G samples after 50 kW/m² radiant heating (showing Test 1 (left) and Test 2 (right)).
Figure 30:

FIG. 30 shows the state of the samples after being removed from the calorimeter.

Results of Small-Scale Testing

All materials were tested at the University of Maryland in an oxygen consumption calorimeter. The results for the cone calorimeter testing demonstrate the importance of the material selection in the development of a more durable fire hose. Several of the materials tested demonstrate a resilience to incident heat fluxes up to 50 kW/m² and did not ignite.

Material 'A' for example, when fixed around the perimeter of the sample, showed no signs or discoloration, thermal degradation, or ignition even after a prolonged exposure to the highest heat flux tested. Other materials also exhibited similar behavior while some ignited almost instantly under the same heat exposure.

Although all the materials tested performed better than conventional materials, material 'A' was selected as a candidate material to prototype as a firehose for full-scale testing as it did not present indications of thermal decomposition.

Full-Scale Fire Test Evaluation

SUMMARY

One material tested under the small-scale measurements, in additional to commercially available fire hose sections, were subjected to full-scale tests to expose larger samples to radiant heat fluxes realistic of the fire environment associated with a compartment fire. These experiments were conducted at both the FDNY training facility on Randall's Island, N.Y. and the Fire & Risk Alliance Laboratory in Rockville, Md. Experiments similar to those conducted by ATF were conducted using a radiant exposure on a pressurized fire hose. The heat flux at the surface of the sample was recorded along with the time until any significant deterioration was observed. Principal measurements of this task include the qualitative observation of material vaporization, charring, and melting behavior and quantitative measurements of exposure heat flux and time to failure. The type of failure observed is also noted for each hoseline.

Full-Scale Testing: Infrared Burner

Full-scale testing evaluated the performance of firehose materials that are currently used by fire departments in the U.S. as well as a prototype firehose made from the best performing material of the small-scale tests. An infrared burner was used to apply an external heat flux to the surface of the charged firehose and the behavior of the material was analyzed.

The infrared burner utilized was a surface combustion, gas-fired burner with a high heat flux density and low combustion velocity that achieves an emitter temperature of nominally 1700° F. Test specimens were subjected to a predetermined external heat flux of 30 kW/m². The 30 kW/m² heat flux selected matched the "low" heat flux value found in the ATF full-scale experiments to result in hose failure and was similar to the intermediate heating value at which the samples were tested in the cone calorimeter tests.

Figure 31:
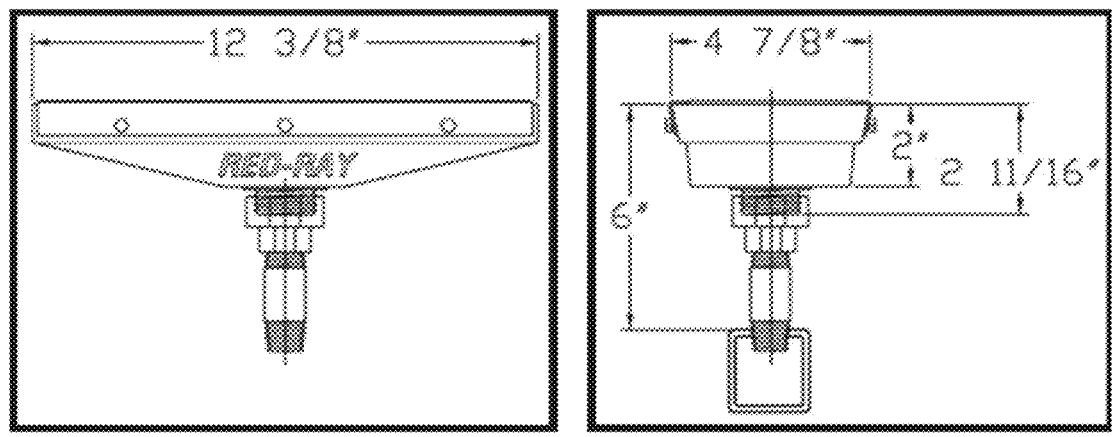
FIG. 31 shows the dimensions of Red-Ray MR-12 Infrared Burner for full-scale testing.
Figure 32:
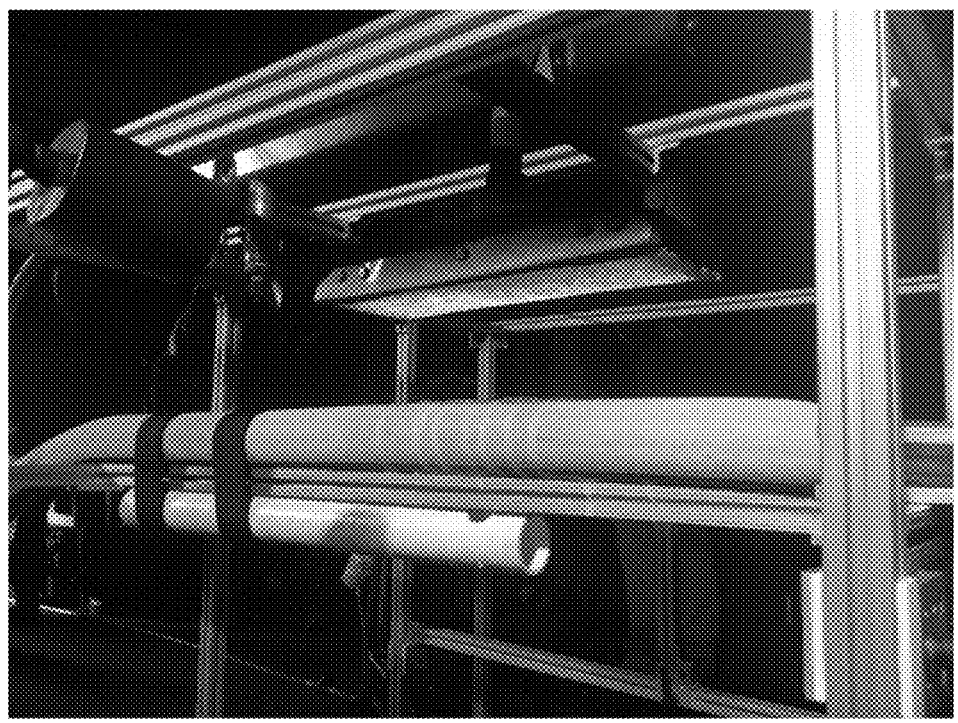
FIG. 32 shows full-scale testing of a charged firehose under 30 kW/m² heat flux.

The infrared burner was placed horizontally above the top of the charged hoseline and provided a uniform heat flux over approximately one foot of fire hose. The span and placement of the heater, shown in FIG. 31 and FIG. 32, resulted in a constant heat exposure to nominally 12" of the top surface of the fire hose test specimen. This condition was considered to be a challenging, yet representative, thermal exposure scenario of a flux measured near the floor at the onset of flashover conditions. The primary measurements of interest in this test were the time durations to off-gassing and hose jacket failure due to pin-hole leaks, weeping, or large hole ruptures.

Results of Full-Scale Testing

Figure 33:
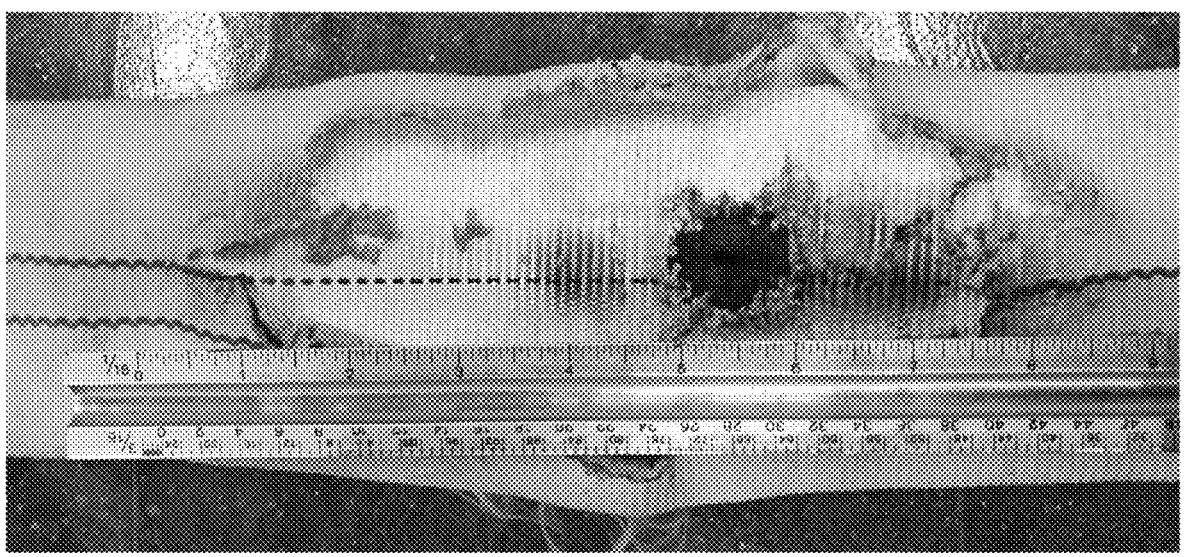
FIG. 33 shows a large hole failure.
Figure 34:
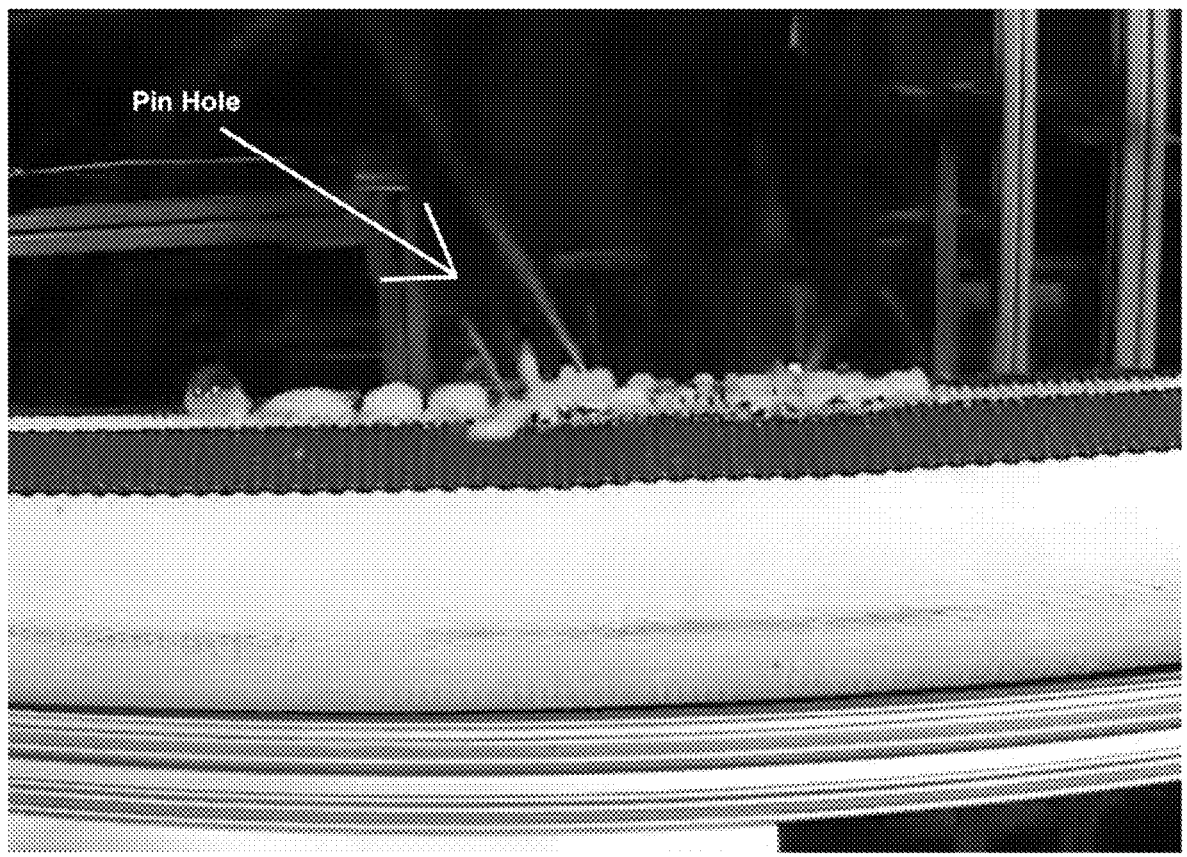
FIG. 34 shows a pin hole failure.
Figure 35:
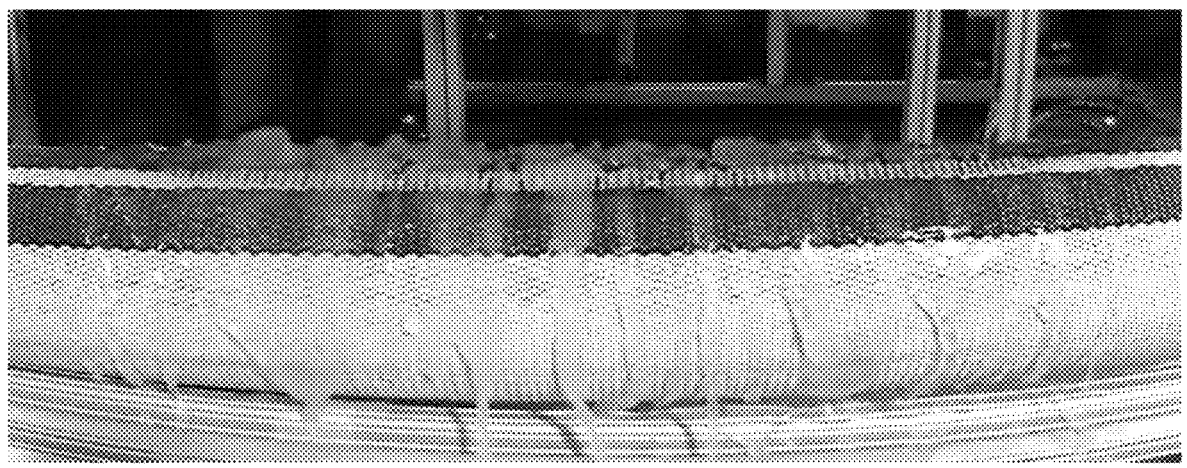
FIG. 35 shows a weeping failure.

Two days of testing took place at the FDNY training academy. The testing consisted of fire hose that is currently available to be used in the fire service. Testing was done at an indoor burn facility sheltered from the effects of wind. A pumper truck at the facility was used to maintain 150 psi water pressure to the hose during testing. Testing conditions remained constant for the two days at FDNY. The testing was conducted to demonstrate how current hoses on the market hold up to the test parameter of 30 kW/m². Multiple tests were done on each hose to examine test repeatability. Failure types observed during testing included large hole failures as seen in FIG. 33. These types of large hole failures are considered catastrophic with water erupting from the hose jacket resulting in the instantaneous loss of pressure and flow. The second type of failure observed was the pin hole failure type where small water jets or misting escaped from the hose jacket as seen in FIG. 34. Pin hole failures result in small amounts of pressure and water loss but do not appear to have a negative effect on firefighting operations. Weeping was the last failure type observed from the fire hose apparatus testing which resulted in water loss through the saturation and leakage of the outer hose jacket as seen in FIG. 35. All tests conducted at the FDNY training academy experienced one of the three failure types and can be seen in Table 3.

TABLE 3

Commercial Fire Hose Testing

| Hose | Jacket Descriptor | Heat Flux (kW/m$^2$) | Failure (seconds) | Failure Type |
| --- | --- | --- | --- | --- |
| A | White weave, rubber hose | 30 | 82 | Large hole |
| A | White weave, rubber hose | 30 | 75 | Large hole |
| B | Red weave, rubber hose | 30 | 108 | Pin hole |
| B | Red weave, rubber hose | 30 | 191 | Pin hole |
| B | Red weave, rubber hose | 30 | 112 | Pin hole |
| B | Red weave, rubber hose | 30 | 88 | Pin hole |
| C | Double lines | 30 | 79 | Weeping |
| C | Solid color | 30 | 108 | Weeping |
| D | Solid color | 30 | 55 | Pin hole |
| D | Solid color | 30 | 58 | Pin hole |
| D | Solid color | 30 | 55 | Pin hole |
| E | Double lines | 30 | 125 | Large hole |

Figure 36:
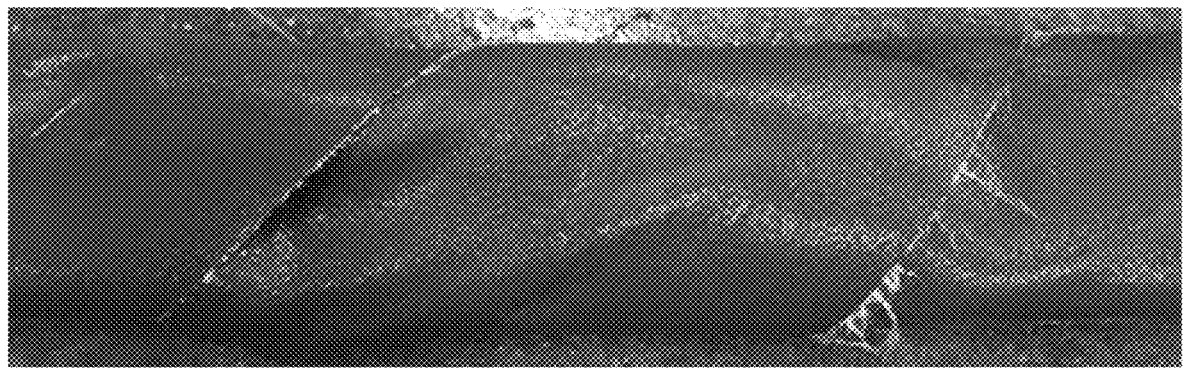
FIG. 36 shows a first prototype of Material 'A'.
Figure 37:
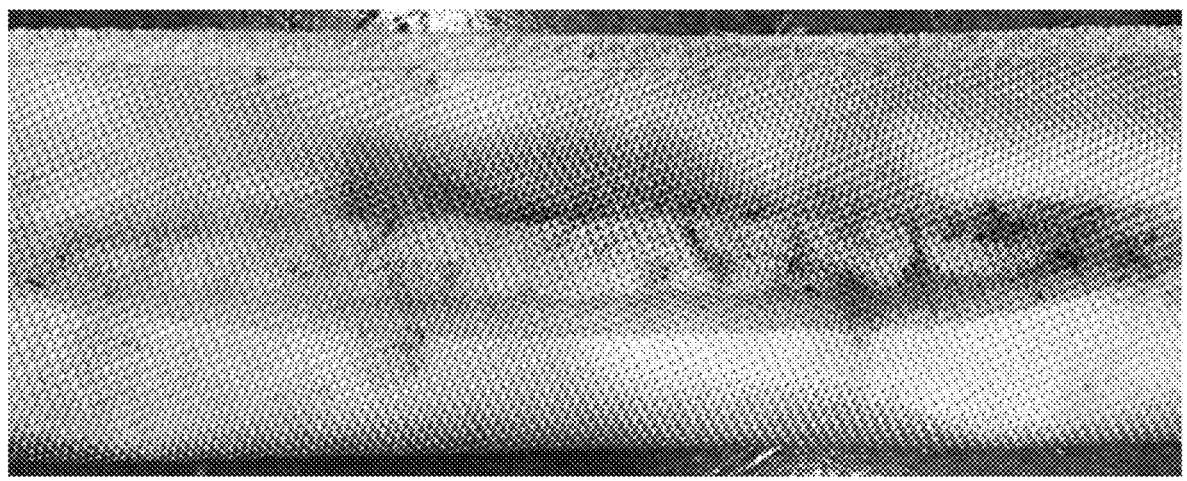
FIG. 37 shows a second prototype 2 of Material 'A'.

In small-scale testing, material 'A' showed no signs of thermal insult after a prolonged exposure to a high heat flux. From this material, several prototype hoses were constructed and tested at Fire & Risk Alliance (FRA), the results of which are shown in Table 4, below. The first test conducted at FRA was a baseline test of a generic rubber lined fire hose to ensure the apparatus was calibrated and functioning as expected. Tests 2 and 3 were tested with the red side of material 'A' facing towards the infrared burner and can be seen in FIG. 36. The tests were run for a duration of 20 minutes after which the radiant heat source was removed, and the sample observed to have no signs of testing with no change to the material itself. Test 4 is material 'Dupre A' inverted to test if the backside of the material holds up as well as the front side, the results of which can be seen in FIG. 37. The black marks around the material were left from the outer jacket burning away and not a representation of how material 'A' reacts to the heat flux exposure. Test 4 was concluded after 20 minutes of testing under 30 (kW/m$^2$) and showed no change to the physical properties of the material. In each test of material 'A' the sample leaked due to the method of assembly, as the hose was not a sleeve, but the material itself did not burn through, ignite, or show signs of thermal degradation during the test.

TABLE 4

Fire Hose Testing

| Material | Jacket Descriptor | Heat Flux (kW/m$^2$) | Failure (seconds) | Failure Type |
| --- | --- | --- | --- | --- |
| Generic rubber hose | Solid color | 30 | 66 | Large hole |
| Dupre A | Solid color | 30 | N/A | N/A |
| Dupre A | Solid color | 30 | N/A | N/A |
| Dupre A | Solid color | 30 | N/A | N/A |

From the full-scale testing, material 'A' shows that both sides of the material can hold up to the designated heat flux without reaching any form of hose failure for exposures lasting 20 minutes at an incident heat flux of 30 kW/m$^2$. Compared to commercially available hoses, the prototype hose construction using material 'A' demonstrates superior resilience to incident heat fluxes.

Conclusions From Testing

The testing of commercial fire hoses demonstrated the need for fire hose construction that can withstand conditions realistic to a real-world fire scenario. These tests also demonstrated that fire hoses of different compositions fail in different manners. Commercial fire hoses tested were observed to fail in range of different severities from large orifice ruptures to small jetting and pinhole leakage. A weeping type failure was also observed for several tests conducted in which water saturated the exposed section of hose from the inside out while still maintaining the flow path of water. Weeping is believed to occur when the inner liner of the hose begins to fail prior to the outer jacket of the hose jacket, releasing water in a form other than jets or streams.

What is claimed is:

1. An attack fire hose comprising:
   (a) a water-tight, rubber inner lining; and
   (b) at least one thermally resistant, woven-fabric inner jacket surrounding and bonded to the inner lining;
   wherein the fire hose can be stored flat, can transport water at pressures within the range of 150 psi to 600 psi, and when charged with water at 150 psi, can withstand exposure of a 12-inch section of the fire hose to 30 kW/m$^2$ of radiant heat flux for at least 15 minutes without failure.

2. The fire hose of claim 1 wherein the rubber inner lining comprises styrene butadiene, ethylene propylene, EPDM, chloroprene, polyurethane, PVC/nitrile rubber, PVC/nitrile butadiene, nitrile butadiene, or combinations thereof.

3. The fire hose of claim 1 wherein the rubber inner lining comprises vulcanized EPDM.

4. The fire hose of claim 1 wherein the thermally resistant, woven-fabric inner jacket comprises fibers, threads, or yarns of a material selected from silica, basalt, alumina, textured glass, fiberglass, vermiculite-coated fiberglass, p-aramid, m-aramid, polyimidazole, oxidized polyacrylonitrile, or combinations thereof.

5. The fire hose of claim 1 wherein the thermally resistant, woven-fabric inner jacket comprises fibers, threads, or yarns of a material selected from silica, basalt, textured glass, fiberglass, vermiculite-coated fiberglass, or combinations thereof.

6. The fire hose of claim 1 wherein the thermally resistant, woven-fabric inner jacket comprises a blend of silica and fiberglass.

7. The fire hose of claim 1 wherein the thermally resistant, woven-fabric inner jacket comprises a blend of silica and alumina.

8. The fire hose of claim 1 wherein the thermally resistant, woven-fabric inner jacket is silicone-coated.

9. The fire hose of claim 8 wherein the silicone-coated inner jacket includes a filler selected from precipitated silica, fumed silica, montmorillonite, carbon black, carbon fiber, iron oxide, zinc oxide, titanium dioxide, glass, graphene, graphene nanoplatelets, alumina, alumina tri-hydrate, or combinations thereof.

10. The fire hose of claim 1 wherein the thermally resistant, woven-fabric inner jacket lacks a silicone coating.

11. The fire hose of claim 1 further comprising an outer jacket made from cotton, polyester, or nylon.

12. The fire hose of claim 1 further comprising an outer jacket made from a thermally resistant fabric.

13. The fire hose of claim 1 wherein the fire hose, when charged with water at 150 psi, can withstand exposure of a 12-inch section of the firehose to 30 kW/m$^2$ of radiant heat flux for at least 20 minutes without failure.

14. The fire hose of claim 1 wherein the fire hose has an inside diameter within the range of 1.25 to 3.0 inches.

15. The fire hose of claim 1 wherein the rubber inner lining further comprises a filler selected from silica, montmorillonite, carbon black, carbon fiber, iron oxide, zinc oxide, titanium dioxide, glass, graphene, alumina, alumina tri-hydrate, or combinations thereof.

16. The fire hose of claim 1 further comprising one or more adhesive layers.

17. The fire hose of claim 1 formed in part by: (a) extruding EPDM to form a tubular liner; (b) vulcanizing the tubular liner; (c) calendering the tubular liner with a thin sheet of uncured EPDM to wrap the sheet around the tubular liner; (d) inserting a section of the tubular liner inside a thermally resistant, woven-fabric inner jacket; and (e) injecting pressurized steam into the tubular liner in a manner effective to vulcanize the thin sheet and bond the inner lining to the thermally resistant, woven-fabric inner jacket.

* * * * *

UNITED STATES PATENT AND TRADEMARK OFFICE
CERTIFICATE OF CORRECTION

| | |
|---|---|
| PATENT NO. | : 11,485,106 B2 |
| APPLICATION NO. | : 17/193446 |
| DATED | : November 1, 2022 |
| INVENTOR(S) | : Noah L. Ryder et al. |

It is certified that error appears in the above-identified patent and that said Letters Patent is hereby corrected as shown below:

On the Title Page

Item (54), the title and in the Specification, Column 1, Line 1, FIRE HOSE AND MATERTAL THEREFORE should be corrected to read -- FIRE HOSE AND MATERIAL THEREFORE --.

Signed and Sealed this
Eleventh Day of April, 2023

Katherine Kelly Vidal
*Director of the United States Patent and Trademark Office*